United States Patent
Nohara et al.

(10) Patent No.: US 12,404,838 B2
(45) Date of Patent: Sep. 2, 2025

(54) BACKLASH MEASURING METHOD, WIND TURBINE DIAGNOSING METHOD, AND BACKLASH MEASURING APPARATUS

(71) Applicant: NABTESCO CORPORATION, Tokyo (JP)

(72) Inventors: Osamu Nohara, Tokyo (JP); Hirofumi Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 65 days.

(21) Appl. No.: 18/305,141

(22) Filed: Apr. 21, 2023

(65) Prior Publication Data
US 2023/0407847 A1 Dec. 21, 2023

(30) Foreign Application Priority Data
Jun. 15, 2022 (JP) ................. 2022-096886

(51) Int. Cl.
*F03D 17/00* (2016.01)
*F03D 15/00* (2016.01)
*G01B 7/14* (2006.01)

(52) U.S. Cl.
CPC ............. *F03D 17/00* (2016.05); *F03D 15/00* (2016.05); *G01B 7/146* (2013.01);
(Continued)

(58) Field of Classification Search
CPC .......... F03D 17/00; F03D 17/12; F03D 15/00; G01B 7/146; G01B 5/166; F05B 2260/80; F05B 2270/305
See application file for complete search history.

(56) References Cited

U.S. PATENT DOCUMENTS 5,609,058 A 3/1997 Gnadt et al.
11,835,128 B2 * 12/2023 Zulauf .................... F16H 19/04

FOREIGN PATENT DOCUMENTS

EP 2395237 B1 1/2017
EP 3786491 A1 3/2021
(Continued)

OTHER PUBLICATIONS

Extended European Search Report dated Nov. 21, 2023, issued in corresponding European Patent Application No. 23169807.7 (8 pgs.).

*Primary Examiner* — Courtney D Heinle
*Assistant Examiner* — John S Hunter, Jr.
(74) *Attorney, Agent, or Firm* — Pillsbury Winthrop Shaw Pittman, LLP

(57) ABSTRACT

A backlash measuring method is provided for measuring backlash at a plurality of different times. The backlash measuring method includes: a rotation amount calculating step of braking a ring gear relative to a second portion while contact between a target tooth and the ring gear achieved in a contacting step is maintained, causing a target pinion to rotate toward a second side in a rotation direction opposite to the first side with a driving force less than a braking force applied to brake the ring gear relative to the second portion until the target tooth touches the ring gear at a tooth surface facing the second side, and calculating an amount of rotation of the target pinion; and a measuring step of measuring backlash between the ring gear and the target pinion based on the amount of rotation of the target pinion calculated in the rotation amount calculating step.

13 Claims, 15 Drawing Sheets

(52) U.S. Cl.
CPC ... *F05B 2260/4031* (2013.01); *F05B 2260/80* (2013.01); *F05B 2270/305* (2013.01)

(56) References Cited

FOREIGN PATENT DOCUMENTS

| | | |
|---|---|---|
| EP | 4083420 A1 | 11/2022 |
| JP | 2015-140777 A | 8/2015 |

* cited by examiner

BACKLASH MEASURING METHOD, WIND TURBINE DIAGNOSING METHOD, AND BACKLASH MEASURING APPARATUS

CROSS-REFERENCE TO RELATED APPLICATIONS

This application is based on and claims the benefit of priority from Japanese Patent Application Serial No. 2022-096886 (filed on Jun. 15, 2022), the contents of which are hereby incorporated by reference in their entirety.

TECHNICAL FIELD

The present invention relates to a backlash measuring method, a wind turbine diagnosing method, and a backlash measuring apparatus.

BACKGROUND

In the conventional art, known driving mechanisms are constituted by a driving device configured to drive a movable part. One among such is a driving mechanism constituted by a plurality of driving devices, which are configured to cooperate with each other to drive a movable part. For example, the wind power generation device disclosed in Japanese Patent Application Publication No. 2015-140777 (the '777 Publication) is installed on the land or on the ocean, and it includes a tower serving as a support post for a power generator, a nacelle disposed on top of the tower and having the power generator enclosed therein, and a rotor disposed on one of the ends of the nacelle and made up by a hub and a blade for receiving wind and converting the received wind into rotational energy. The wind power generation device further has a yaw bearing gear on the tower and a plurality of yaw actuators on the nacelle, which serve as a plurality of driving devices. In the wind power generation device, the yaw bearing gear is configured to mesh with the pinion gears of the yaw actuators, so that rotation is output from the yaw actuators to cause the nacelle to yaw relative to the tower.

In a wind turbine including a ring gear and a driving device that has a pinion configured to mesh with the ring gear, it may be required to measure the backlash between the ring gear and the pinion. More specifically, a backlash measuring method is desired that enables backlash to be easily measured at a plurality of different times.

SUMMARY

The present invention has been made in view of such circumstances, and an object of the invention is to provide a backlash measuring method that enables backlash to be measured at a plurality of different times.

The present invention provides a backlash measuring apparatus for a wind turbine including a ring gear and a driving mechanism, the ring gear being fixedly attached to a first portion of the wind turbine, the driving mechanism being fixedly attached to a second portion of the wind turbine, the driving mechanism including a driving device having a pinion meshing with the ring gear, the driving mechanism being configured to rotate in a circumferential direction of the ring gear to drive the second portion relative to the first portion. The backlash measuring apparatus is configured to measure backlash between the ring gear and a target pinion, and the target pinion is the pinion of the driving device. The backlash measuring apparatus includes: a rotation amount calculating unit for calculating an amount of rotation of the target pinion when the target pinion rotates, from a state where a target tooth that is one of teeth of the target pinion is in contact at a tooth surface facing a first side in a rotation direction of the target pinion with the ring gear, toward a second side opposite to the first side in the rotation direction until the target tooth touches the ring gear at a tooth surface facing the second side in the rotation direction; and a measuring unit for measuring the backlash between the ring gear and the target pinion based on the amount of rotation of the target pinion calculated by the rotation amount calculating unit.

The present invention provides a backlash measuring apparatus for a wind turbine including a ring gear and a driving mechanism, the ring gear being fixedly attached to a first portion of the wind turbine, the driving mechanism being fixedly attached to a second portion of the wind turbine, the driving mechanism including a driving device having a pinion meshing with the ring gear, the driving mechanism being configured to rotate in a circumferential direction of the ring gear to drive the second portion relative to the first portion. The backlash measuring apparatus is configured to measure backlash between a target pinion and the ring gear, and the target pinion is the pinion of the driving device. The backlash measuring apparatus includes: a driving mechanism rotation amount calculating unit for calculating an amount of rotation of the driving mechanism when the driving mechanism rotates, from a state where a target tooth that is one of teeth of the target pinion is in contact at a tooth surface facing a first side in a circumferential direction of the target pinion with the ring gear, toward a second side opposite to the first side in the circumferential direction until the target tooth touches the ring gear at a tooth surface facing the second side in the circumferential direction; and a measuring unit for measuring the backlash between the ring gear and the target pinion based on the amount of rotation of the driving mechanism calculated by the driving mechanism rotation amount calculating unit.

The backlash measuring apparatus relating to the present invention may further include a load sensor for measuring load applied by the ring gear to the target pinion.

The present invention provides a backlash measuring method for a wind turbine including a ring gear and a driving mechanism, the ring gear being fixedly attached to a first portion of the wind turbine, the driving mechanism being fixedly attached to a second portion of the wind turbine, the driving mechanism including a driving device having a pinion meshing with the ring gear, the driving mechanism being configured to rotate in a circumferential direction of the ring gear to drive the second portion relative to the first portion. The backlash measuring method is configured to measure backlash between a target pinion and the ring gear, and the target pinion being the pinion of the driving device. The backlash measuring method includes: a contacting step of bringing a target tooth of the target pinion into contact, at a tooth surface facing a first side in a rotation direction of the target pinion, with the ring gear, the target tooth being one of teeth of the target pinion; a rotation amount calculating step of (i) braking the ring gear relative to the second portion while the contact between the target tooth and the ring gear achieved in the contacting step is maintained, (ii) causing the target pinion to rotate toward a second side in the rotation direction opposite to the first side with a driving force less than a braking force applied to brake the ring gear relative to the second portion until the target tooth touches the ring gear at a tooth surface facing the second side in the rotation direction, and (iii) calculating an amount of rotation of the target pinion; and a measuring step of measuring the backlash between the ring gear and the target pinion based on the amount of rotation of the target pinion calculated in the rotation amount calculating step.

In the backlash measuring method relating to the present invention, the driving mechanism may include a plurality of driving devices, and each driving device may include a pinion meshing with the ring gear, and the backlash measuring method may be used to measure backlash between the ring gear and the target pinion, and the target pinion is one of the pinions of the plurality of driving devices.

In the backlash measuring method relating to the present invention, the driving device may include: an actuator for inputting rotation into the pinion; and a speed reducer for reducing the input rotation transmitted from the actuator and transmitting the reduced rotation to the pinion, and in the rotation amount calculating step, the amount of rotation of the target pinion may be calculated based on a measured amount of the input rotation transmitted from the actuator to the speed reducer.

In the backlash measuring method relating to the present invention, in at least one of the contacting step or the rotation amount calculating step, whether the target tooth touches the ring gear may be detected by detecting a change in load measured by a load sensor configured to measure load applied by the ring gear to the target pinion.

In the backlash measuring method relating to the present invention, the driving device may include an actuator for inputting rotation into the pinion. The contacting step may include: a detecting step of detecting whether the target tooth touches the ring gear by detecting a rise in load measured by the load sensor; an inputting step of, when the load sensor detects that the target tooth touches the ring gear in the detecting step, allowing the actuator to input rotation into the target pinion, the rotation being directed toward one of sides in the rotation direction of the target pinion; and an identifying step of, when the rotation input in the inputting step causes a rise in the load measured by the load sensor, identifying a side toward which the rotation input in the inputting step is directed as the first side in the rotation direction faced by the tooth surface of the target tooth that is in contact with the ring gear.

In the backlash measuring method relating to the present invention, the each driving device may include a brake unit for preventing rotation of the pinion, and in the contacting step, while the target pinion is braked by the brake unit and a pinion other than the target pinion is free from braking by a brake unit, the target tooth may be brought into contact with the ring gear using an external force designed to rotate the second portion relative to the first portion.

In the backlash measuring method relating to the present invention, the driving device may include: an actuator for inputting rotation into the pinion; and a brake unit for preventing rotation of the pinion. In the contacting step, the target tooth may be brought into contact with the ring gear by causing the actuator to rotate the target pinion while the ring gear is braked relative to the second portion.

In the backlash measuring method relating to the present invention, the driving device may include an actuator for inputting rotation into the pinion. In the rotation amount calculating step, the actuator may be used to rotate the target pinion toward the second side in the rotation direction.

In the backlash measuring method relating to the present invention, the driving device may include a brake unit for preventing rotation of the pinion. In the contacting step, the target tooth may be brought into contact with the ring gear so that the target pinion is pressed by the ring gear, and the target pinion is braked by the brake unit so that the target tooth remains in contact with the ring gear. In the rotation amount calculating step, the brake unit may stop braking the target pinion so that the target pinion is released from being pressed against the ring gear and a restoring force is in turn created, and the restoring force may act to rotate the target pinion toward the second side in the rotation direction.

In the backlash measuring method relating to the present invention, the wind turbine may further include a rotation brake for preventing rotation of the second portion relative to the ring gear. In the rotation amount calculating step, the rotation brake may prevent rotation of the second portion relative to the ring gear, so that the ring gear is braked relative to the second portion.

In the backlash measuring method relating to the present invention, the each driving device may include a brake unit for preventing rotation of the pinion. In the rotation amount calculating step, the ring gear may be braked relative to the second portion by allowing at least one of pinions other than the target pinion to be braked by a brake unit.

The present invention provides a backlash measuring method for a wind turbine including a ring gear and a driving mechanism, the ring gear being fixedly attached to a first portion of the wind turbine, the driving mechanism being fixedly attached to a second portion of the wind turbine, the driving mechanism including a driving device having a pinion meshing with the ring gear, the driving mechanism being configured to rotate in a circumferential direction of the ring gear to drive the second portion relative to the first portion. The backlash measuring method is configured to measure backlash between a target pinion and the ring gear, and the target pinion is the pinion of the driving device. The backlash measuring method includes: a contacting step of bringing a target tooth of the target pinion into contact, at a tooth surface facing a first side in a circumferential direction of the ring gear, with the ring gear, the target tooth being one of teeth of the target pinion; a driving mechanism rotation amount calculating step of (i) preventing the target pinion from rotating while the contact between the target tooth and the ring gear achieved in the contacting step is maintained, (ii) rotating the driving mechanism toward a second side in the circumferential direction opposite to the first side with a driving force less than a braking force applied to brake the target pinion until the target tooth touches the ring gear at a tooth surface facing the second side in the circumferential direction, and (iii) calculating an amount of rotation of the driving mechanism; and a measuring step of measuring the backlash between the ring gear and the target pinion based on the amount of rotation of the driving mechanism calculated in the driving mechanism rotation amount calculating step.

The present invention provides a wind turbine diagnosing method. The wind turbine diagnosing method includes: a first measuring step of performing the backlash measuring method described above at a first time to measure backlash at the first time; a second measuring step of performing the backlash measuring method at a second time subsequent to the first time to measure the backlash at the second time; and a diagnosing step of diagnosing a condition of the wind turbine based on the backlash measured at the first time and the backlash measured at the second time.

In the wind turbine diagnosing method relating to the present invention, in the diagnosing step, a difference may be calculated by subtracting the backlash measured at the second time from the backlash measured at the first time as a total abraded width by which the ring gear and the target pinion are abraded within a period from the first time to the second time, and the condition of the wind turbine may be diagnosed based on the total abraded width.

A wind turbine diagnosing method relating to the present invention may include: a collecting step of performing the backlash measuring method described above at a plurality of different times to collect chronological data for the backlash; and a diagnosing step of diagnosing a condition of the wind turbine based on the chronological data for the backlash collected in the collecting step.

The present invention provides a wind turbine diagnosing method for a wind turbine including a ring gear and a driving mechanism, the ring gear being fixedly attached to a first portion of the wind turbine, the driving mechanism being fixedly attached to a second portion of the wind turbine, the driving mechanism including one or more driving devices having respective pinions meshing with the ring gear, the driving mechanism being configured to rotate in a circumferential direction of the ring gear to drive the second portion relative to the first portion. The wind turbine diagnosing method includes: a first measuring step of measuring backlash between the ring gear and a first target pinion at a first time, the first target pinion being one of the pinions of the driving devices; a second measuring step of measuring backlash between the ring gear and a second target pinion at a second time subsequent to the first time, the second target pinion being one of the pinions of the driving devices; and a diagnosing step of diagnosing a condition of the wind turbine based on the backlash measured at the first time and the backlash measured at the second time.

Advantageous Effects

The present invention can provide a backlash measuring method that enables backlash to be measured at a plurality of different times.

DESCRIPTION OF THE PREFERRED EMBODIMENTS

First Embodiment

Figure 1:
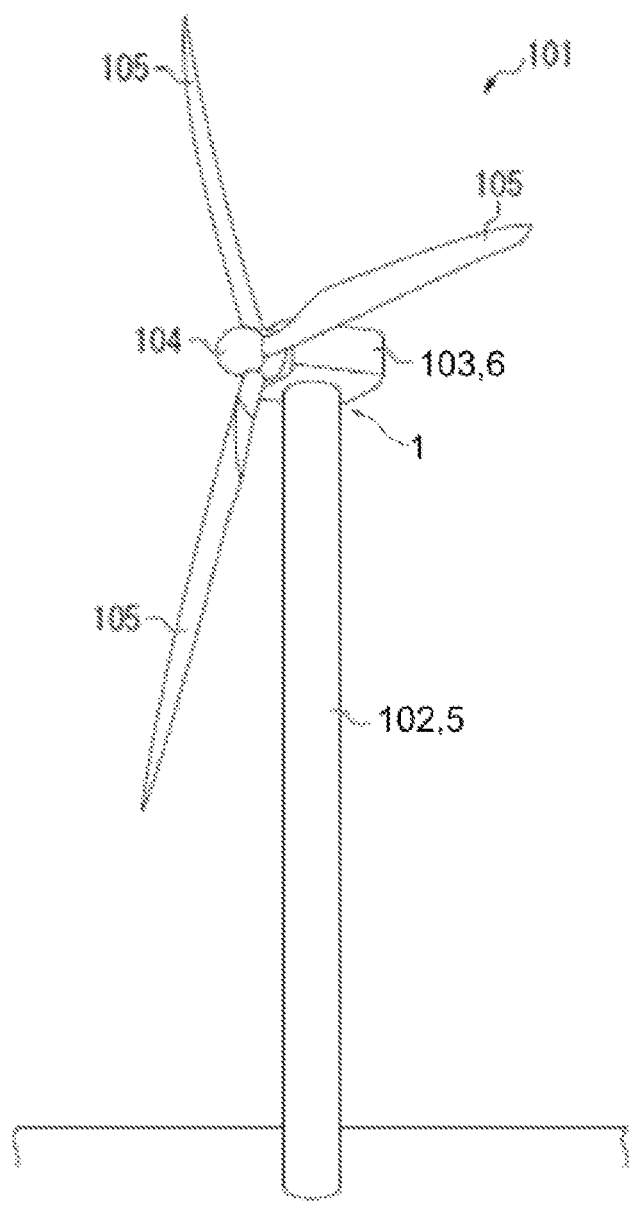
FIG. 1 is a perspective view showing an example configuration of a wind turbine according to a first embodiment of the invention.

Embodiments of the present invention will now be described with reference to the appended drawings. A wind turbine 10 is first described that includes a driving mechanism 1, to which a backlash measuring method relating to a first embodiment of the present invention is applied. FIG. 1 is a perspective view showing an example of the configuration of the wind turbine 10. The wind turbine 10 includes a wind turbine body 101. The wind turbine body 101 includes a tower 102, a nacelle 103, a rotor (main shaft part) 104, and a plurality of blades (vanes) 105. The tower 102 extends vertically upward from the land or the sea.

The wind turbine 10 has a first portion 5 and a second portion 6. The second portion 6 is configured to be driven relative to the first portion 5. In the first embodiment, the tower 102 of the wind turbine body 101 is defined as the first portion 5. The nacelle 103 of the wind turbine body 101 is defined as the second portion 6. In addition to the wind turbine body 101, the wind turbine 10 has the driving mechanism 1. The driving mechanism 1 is fixedly attached to the second portion 6 of the wind turbine 10, and configured to drive the second portion 6 relative to the first portion 5. In the first embodiment, the nacelle 103 is attached to the top of the tower 102 such that the nacelle 103 is rotatable relative to the tower 102. In other words, the connecting portion between the tower 102 and the nacelle 103 constitutes the moving part configured to rotate the nacelle 103 relative to the tower 102. The driving mechanism 1 is fixed on the nacelle 103 and configured to drive the nacelle 103 relative to the tower 102. The driving mechanism 1 drives the nacelle 103 such that the nacelle 103 is rotatable around the longitudinal axis of the tower 102. In this manner, the nacelle 103 rotates in the yaw direction (YAW) relative to the tower 102.

The rotor 104 rotates in the roll direction (ROLL) on the nacelle 103. The plurality (e.g., three) of blades 105 are provided on the rotor 104 at equal angles relative to each other, such that they extend radially from the rotation axis of the roll direction.

Figure 2:
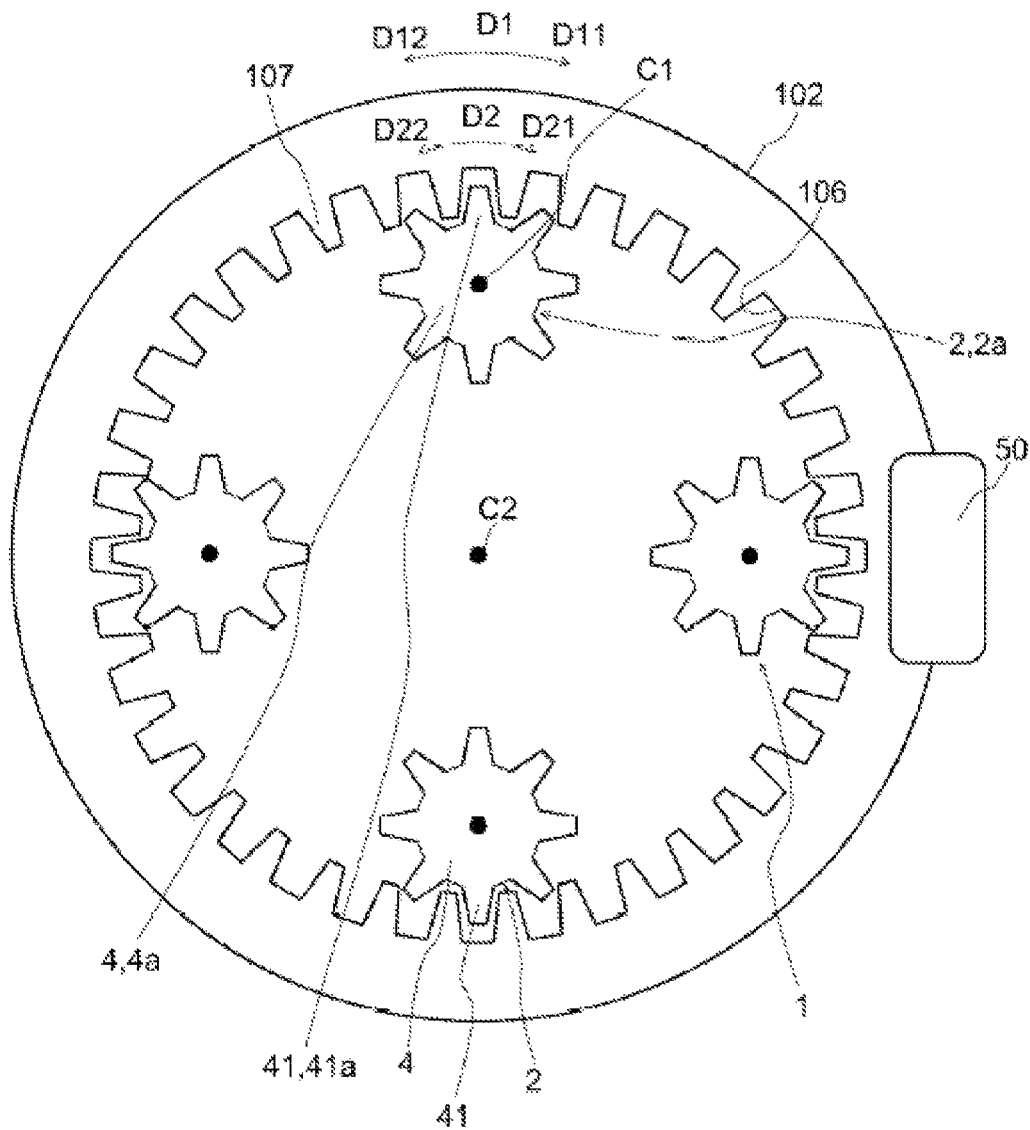
FIG. 2 is a top view showing a driving mechanism relating to the first embodiment.

The following now describes the driving mechanism 1 more specifically. FIG. 2 is a top view showing the driving mechanism 1 relating to the first embodiment. The wind turbine 10 further has a ring gear 106 fixedly attached to the first portion 5 (tower 102). The ring gear 106 has a plurality of teeth 107. In the example shown in FIG. 2, the ring gear 106 has an annular shape with the teeth 107. On the other hand, the driving mechanism 1 has a driving device 2. The driving device 2 includes a pinion 4 meshing with the ring gear 106. The driving mechanism 1 relating to the first embodiment has a plurality of driving devices 2. The driving devices 2 respectively have pinions 4 meshing with the ring gear 106. In the example shown in FIG. 2, the pinion 4 of each driving device 2 has a plurality of teeth 41, and the teeth 107 of the ring gear 106 mesh with the teeth 41 of the pinions 4. Although not shown in FIG. 2, the driving devices 2 each have a driving unit 3 for driving the pinion 4, as will be described below.

In the first embodiment, the driving devices 2 are fixedly attached to the second portion 6 (nacelle 103) and configured to generate a yaw driving force. In the first embodiment, four driving devices 2 are fixedly attached to the second portion 6 (nacelle 103). When the driving devices 2 are attached to the nacelle 103, the driving units 3 may be housed within the nacelle 103. These driving devices may be hereinafter collectively referred to simply as "the driving devices 2." In the first embodiment, the driving devices 2 are fixedly attached to the nacelle 103 using a plurality of bolts 35. The bolts 35 are arranged annually. In this case, when the teeth 41 of the pinions 4 touch the ring gear 106, the ring gear 106 applies load to the pinions 4, as a result of which the bolts 35 are strained.

The driving mechanism 1 rotates in the circumferential direction D1 of the ring gear 106, to drive the second portion 6 (nacelle 103) relative to the first portion 5 (tower 102). In the example shown in FIG. 2, the ring gear 106 is formed in the inner wall of the tower 102. In this case, the ring gear 106 has a plurality of internal teeth as the teeth 107, as shown in FIG. 2. The pinions 4 of the driving devices 2 mesh with the ring gear 106 formed in the inner wall of the tower 102. Although not shown, the ring gear 106 may be alternatively formed in the outer wall of the tower 102. In this case, the ring gear 106 has a plurality of external teeth as the teeth 107. The pinions 4 of the driving devices 2 mesh with the ring gear 106 formed in the outer wall of the tower 102.

In each driving device 2, the driving unit 3 drives the pinion 4 so that the pinion 4 rotates about the rotation axis C1. As the pinions 4 rotate, the respective driving devices 2 move in the circumferential direction D1 of the ring gear 106. As the driving devices 2 all move in the circumferential direction D1, the second portion 6 (nacelle 103), to which the driving mechanism 1 is fixedly attached, can rotate around the center of rotation C2 in the yaw direction relative to the first portion 5 (tower 102), to which the ring gear 106 is fixedly attached. Here, the sign "D11" refers to a first side in the circumferential direction D1 of the ring gear 106. The sign "D12" refers to a second side in the circumferential direction D1 opposite to the first side D11.

The wind turbine 10 further has a rotation brake for slowing down the rotation of the second portion 6 (nacelle 103) relative to the ring gear 106. In the first embodiment, the rotation brake is a hydraulic brake attached to the second portion 6 (nacelle 103) and configured to apply a braking force to the ring gear 106. The hydraulic brake is, for example, a caliper brake mechanism. The hydraulic brake includes a hydraulic brake driving unit, not shown, and a friction member 50, shown in FIG. 2. The hydraulic brake driving unit is configured to move the friction member in the direction parallel to the direction in which the rotation axis C1 of the pinions 4 shown in FIG. 2 extends (the direction perpendicular to the plane of paper of FIG. 2) in accordance with a control signal provided externally. The hydraulic brake driving unit applies a braking force to the ring gear 106 by urging the friction member 50 against the ring gear 106. The rotation brake is preferably capable of adjusting the braking force applied to the ring gear 106.

Figure 3:
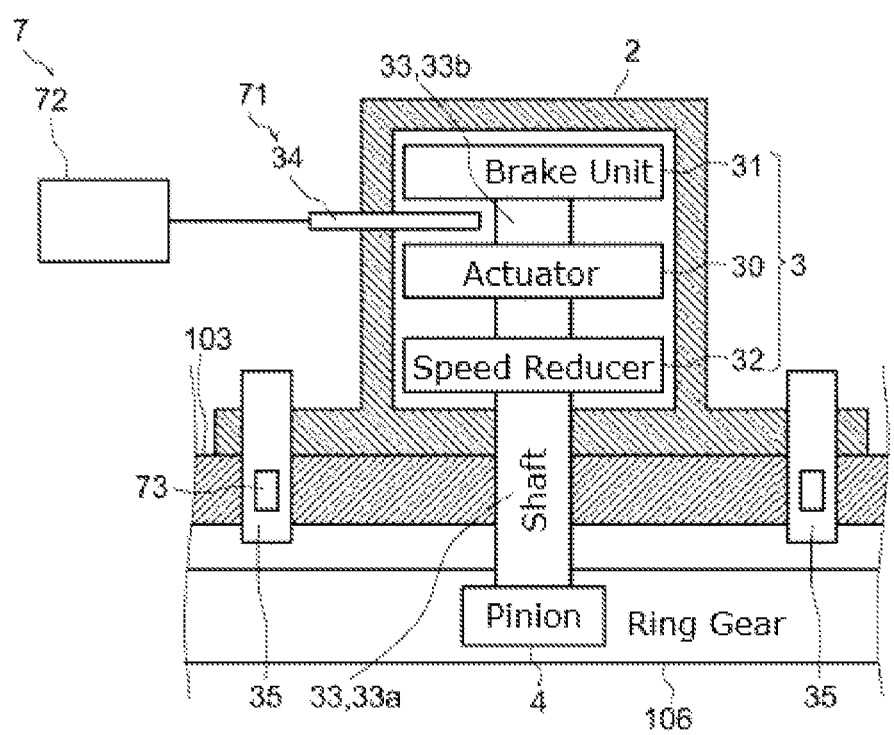
FIG. 3 shows an example configuration of a driving device relating to the first embodiment.

FIG. 3 shows one example configuration of the driving devices 2. FIG. 3 is only a schematic view, where the teeth 107 of the ring gear 106 and the teeth 41 of the pinions 4 are not shown. In the example shown in FIG. 3, the ring gear 106 is positioned on the top portion of the tower 102.

The driving devices 2 have an actuator 30 for inputting rotation into the pinions 4. The driving devices 2 also have a speed reducer 32 for reducing the input rotation transmitted from the actuator 30 and transmitting the reduced rotation to the pinions 4. In the first embodiment, the driving devices 2 each have the actuator 30 and the speed reducer 32. In the first embodiment, the actuator 30 and the speed reducer 32 are included in the driving unit 3 of each driving device 2. The driving devices 2 also have a brake unit 31 for slowing down the rotation of the pinions 4. In the first embodiment, the driving devices 2 each have the brake unit 31. In the first embodiment, the brake unit 31 is included in the driving unit 3 of each driving device 2. The driving unit 3 further has a shaft 33. The shaft 33 is divided into a first shaft portion 33a and a second shaft portion 33b by the speed reducer 32. The first shaft portion 33a is located on the pinion 4 side with respect to the speed reducer 32, and the second shaft portion 33b is located on the actuator 30 side with respect to the speed reducer 32.

The actuator 30 is, for example, a motor. The actuator 30 is configured to rotate the shaft 33 about the longitudinal axis of the shaft 33 as electric current is supplied to the actuator 30. The actuator 30 rotates the second shaft portion 33b of the shaft 33.

In the first embodiment, the brake unit 31 uses an electromagnetic brake to reduce the speed of the rotation of the shaft 33. The brake unit 31 may use the electromagnetic brake to keep the shaft 33 suspended from rotating.

The speed reducer 32 reduces the speed of the rotation of the second shaft portion 33b of the shaft 33 and transmits the reduced rotation to the first shaft portion 33a of the shaft 33. The speed reducer 32 includes gears serving as a speed reducing mechanism. The speed reducer 32 uses the gears included therein to set the rotational speed of the first shaft portion 33a of the shaft 33. When driven by the actuator 30, the first shaft portion 33a of the shaft 33 to rotate at the rotational speed set by the speed reducer 32. The shaft 33, which is driven by the actuator 30, rotates with a predetermined torque (shaft torque). The pinion 4 rotates in mesh with the teeth 107 of the ring gear 106 in accordance with the amount of rotation of the first shaft portion 33a of the shaft 33. The pinion 4 is provided at the end of the first shaft portion 33a of the shaft 33 of the driving unit 3. Therefore, the pinion 4 rotates as the first shaft portion 33a of the shaft 33 rotates. As the actuator 30 rotates the pinion 4 via the shaft 33, the driving mechanism 1 rotates in the direction along the circumferential direction D1 of the ring gear 106 as described above, so that the second portion 6 (nacelle 103) is driven relative to the first portion 5 (tower 102).

The following now describes the method of measuring the backlash between the ring gear 106 and the pinions 4 of the driving devices 2 in the wind turbine 10 described above. The following also describes a backlash measuring apparatus 7 for measuring the backlash between the ring gear 106 and the pinions 4 of the driving devices 2. Among the pinions 4 of the driving devices 2, a target pinion 4a denotes the pinion 4 for which the backlash is measured. Among the driving devices 2, a target driving device 2a refers to the driving device 2 having the target pinion 4a.

Figure 4:
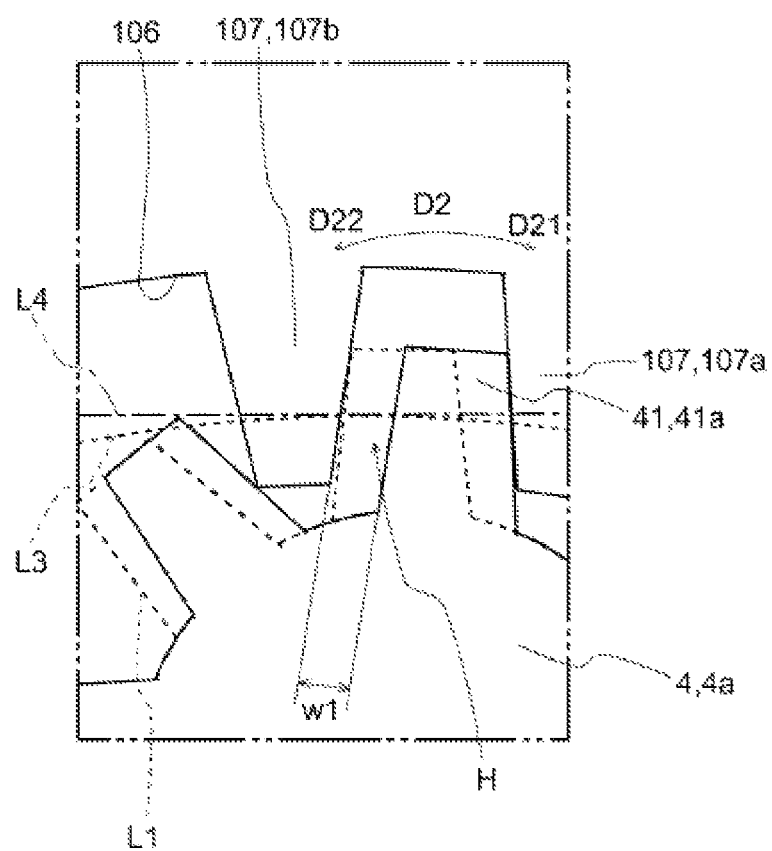
FIG. 4 is a top view showing, as an example, how a plurality of driving devices are positioned relative to a ring gear in the first embodiment.

The following first describes what is indicated by the term "backlash." Backlash denotes the dimension of the gap between two meshing gears. Specifically, when the teeth of a first one of the gears are in contact, at their tooth surfaces facing one side in the rotational direction of the first gear, with the teeth of a second one of the gears, the backlash denotes the dimension of the gap between the tooth surfaces facing the opposite side in the rotational direction of the first gear and the teeth of the second gear facing these tooth surfaces of the first gear. FIG. 4 shows an enlarged view of a portion of the wind turbine 10 shown in FIG. 2, where the teeth 41 of the target pinion 4a mesh with the teeth 107 of the ring gear 106. In the example shown in FIG. 4, one of the teeth 41 of the target pinion 4a or a target tooth 41a is in contact, at its tooth surface facing one side in the rotational direction D2 of the target pinion 4a, with a first tooth 107a of the ring gear 106. The backlash represents the dimension of the gap H between (i) the tooth surface of the target tooth 41a of the target pinion 4a facing the other side in the rotational direction D2 and (ii) a second tooth 107b of the ring gear 106 facing the tooth surface of the target tooth 41a. The backlash measured in the first embodiment is the normal backlash. In the example shown in FIG. 4, the normal backlash is the minimum width w1 of the gap H between the tooth surface of the target tooth 41a of the target pinion 4a facing the opposite side in the rotational direction D2 and the second tooth 107b of the ring gear 106 facing the tooth surface of the target tooth 41a.

The following now describes the significance of measuring the backlash between the ring gear 106 and the target pinion 4a.

When the wind turbine 10 is used, the driving mechanism 1 drives the second portion 6 relative to the first portion 5, as a result of which the teeth 107 of the ring gear 106 and the teeth 41 of the pinions 4 are expected to wear out. The teeth 107 of the ring gear 106 and the teeth 41 of the pinions 4 increasingly wear out. As a result, when the driving mechanism 1 drives the second portion 6, the driving mechanism 1 and second portion 6 significantly rattle. To handle this issue, how much the teeth 107 of the ring gear 106 and the teeth 41 of the pinions 4 wear off (hereinafter, referred to as "the wear amount of the teeth 107 and 41") can be measured, so that the rattling of the driving mechanism 1 and second portion 6 can be determined. As the teeth 107 of the ring gear 106 and the teeth 41 of the pinions 4 increasingly wear out, fatigue fracture is more likely to occur in the ring gear 106 and pinions 4. To handle this issue, the wear amount of the teeth 107 of the ring gear 106 and the teeth 41 of the pinions 4 can be measured, so that the likelihood of the fatigue fracture in the ring gear 106 and pinions 4 can be determined. To prevent the teeth 107 of the ring gear 106 and the teeth 41 of the pinions 4 from wearing out, the surfaces of the ring gear 106 and pinions 4 may be formed by a hardened layer. In this case, if the teeth 107 of the ring gear 106 and the teeth 41 of the pinions 4 wear out to a certain degree, the hardened layer may be completely abraded from the teeth 107 of the ring gear 106 and the teeth 41 of the pinions 4, which may compromise the strength of the ring gear 106 and pinions 4. To handle this issue, the wear amount of the teeth 107 of the ring gear 106 and the teeth 41 of the pinions 4 can be measured, so that how much the hardened layer wears out (hereinafter, referred to as "the wear amount of the hardened layer") can be determined. For the reasons stated above, there has been a demand for measuring the wear amount of the teeth 107 of the ring gear 106 and the teeth 41 of the pinions 4.

As the teeth 107 of the ring gear 106 and the teeth 41 of the pinions 4 increasingly wear out, the backlash or the dimension of the gap H between the teeth 107 of the ring gear 106 and the target tooth 41a of the target pinion 4a increases. In light of the above, measuring the backlash between the ring gear 106 and the target pinion 4a can result in measuring the wear amount of the teeth 107 of the ring gear 106 and the teeth 41 of the pinions 4.

More specifically, the backlash is measured at a plurality of different times to collect the values of the backlash at different times. This can result in measuring how the wear amount of the teeth 107 of the ring gear 106 and the teeth 41 of the pinions 4 change over time. This chronological change in wear amount can be used to predict the future condition of the ring gear 106 and pinions 4 and also to plan maintenance of the ring gear 106 and pinions 4. The future condition of the ring gear 106 and pinions 4 that can be predicted based on the chronological change in wear amount is, for example, the wear amount of the ring gear 106 and pinions 4 that will be observed at a time subsequent to the time at which the backlash is actually measured. The chronological change in wear amount can be used to predict the time at which the wear amount of the ring gear 106 and pinions 4 exceeds an allowable upper limit.

The following now describes the method of measuring the backlash between the ring gear 106 and the target pinion 4a, which is one of the pinions 4 of the driving devices 2. For example, the method described below is used to measure the backlash between the ring gear 106 and the target pinion 4a shown in FIG. 2. The following also describes the backlash measuring apparatus 7 for measuring the backlash between the ring gear 106 and the target pinion 4a, which is one of the pinions 4 of the driving devices 2.

The backlash measuring method relating to the first embodiment includes a contacting step, a rotation amount calculating step and a measuring step. In the contacting step, the target tooth 41a, which is one of the teeth 41 of the target pinion 4a, is brought into contact at the tooth surface facing the first side D21 in the rotational direction of the target pinion 4a with the ring gear 106. In the rotation amount calculating step, the ring gear 106 is braked relative to the second portion 6 while the contact between the target tooth 41a and the ring gear 106, which is established in the contacting step, is maintained. Subsequently, the target pinion 4a is rotated toward the second side D22 opposite to the first side D21 in the rotation direction with a driving force less than the braking force applied to brake the ring gear 106 relative to the second portion 6 until the target tooth 41a touches the ring gear 106 at the tooth surface facing the second side D22 in the rotation direction, and how much the target pinion 4a needs to rotate (hereinafter, referred to as the rotation amount of the target pinion 4a) is calculated. In the measuring step, the backlash between the ring gear 106 and the target pinion 4a is measured based on the rotation amount of the target pinion 4a calculated in the rotation amount calculating step.

The driving mechanism 1 relating to the first embodiment has more than one driving device 2. According to the backlash measuring method relating to the first embodiment, the backlash between the ring gear 106 and the target pinion 4a, which is one of the pinions 4 of the driving devices 2, is measured.

The backlash measuring apparatus 7 relating to the first embodiment includes a rotation amount calculating unit 71 and a measuring unit 72. The rotation amount calculating unit 71 calculates how much the target pinion 4a needs to rotate toward the second side D22 in the rotation direction from the state where the target tooth 41a, which is one of the teeth 41 of the target pinion 4a, is in contact with the ring gear 106 at the tooth surface facing the first side D21 in the rotation direction of the target pinion 4a until the target tooth 41a touches the ring gear 106 at the tooth surface facing the second side D22 opposite to the first side D21 in the rotation direction. The rotation amount calculating unit 71 can perform the rotation amount calculating step, which is part of the backlash measuring method. The measuring unit 72 is configured to measure the backlash between the ring gear 106 and the target pinion 4a based on the rotation amount of the target pinion 4a calculated by the rotation amount calculating unit 71. The measuring unit 72 can perform the measuring step, which is part of the backlash measuring method.

The backlash measuring apparatus 7 relating to the first embodiment further includes a load sensor 73 for measuring the load applied by the ring gear 106 to the target pinion 4a. The load sensor 73 can be any sensor as long as it is capable of measuring the load applied by the ring gear 106 to the target pinion 4a.

When the target tooth 41a is in contact with the ring gear 106, the load sensor 73 relating to the first embodiment can detect the side in the rotation direction D2 faced by the tooth surface of the target tooth 41a that is in contact with the ring gear 106. For example, the load sensor 73 can determine the direction in which the load is applied by the ring gear 106 to the target pinion 4a, thereby detecting which one of the sides in the rotation direction D2 is faced by the tooth surface of the target tooth 41a that is in contact with the ring gear 106.

In the backlash measuring method, the load applied by the ring gear 106 to the target pinion 4a can be measured by detecting whether the current flowing through the actuator 30 increases or decreases, in place of using the load sensor 73 for measuring the load applied by the ring gear 106 to the target pinion 4a. This alternative method is based on, for example, the fact that, while the actuator 30 is rotating the pinion 4, the current fed to the actuator 30 to rotate the pinion 4 is larger when load is applied to the pinion 4 than when no load is applied to the pinions 4. When this method is employed, it is determined that load is applied to the pinion 4 if the current flowing through the actuator 30 increases from the value observed when no load is applied to the pinion 4.

The driving mechanism 1 relating to the first embodiment has a plurality of driving devices 2, and each driving device 2 has the pinion 4. The backlash measuring apparatus 7 relating to the first embodiment includes a plurality of load sensors 73, and each load sensor 73 is configured to measure the load applied by the ring gear 106 to the pinion 4 of a corresponding one of the driving devices 2.

In the backlash measuring method relating to the first embodiment, at least one of the contacting step or the rotation amount calculating step described above is configured to detect a change in load measured by the load sensor 73 in order to detect whether the target tooth 41a touches the ring gear 106. s The following more specifically describes the backlash measuring method relating to the first embodiment. In a case where the wind turbine 10 is installed at a site where onshore or offshore wind power generation can be performed, the backlash measuring method relating to the first embodiment is performed, for example, when blades 105 are not rotating and the wind turbine 10 is waiting for suitable wind to rotate the blades 105. In other words, the backlash measuring method relating to the first embodiment is performed, for example, when the wind turbine 10 is waiting for wind.

Figure 5A:
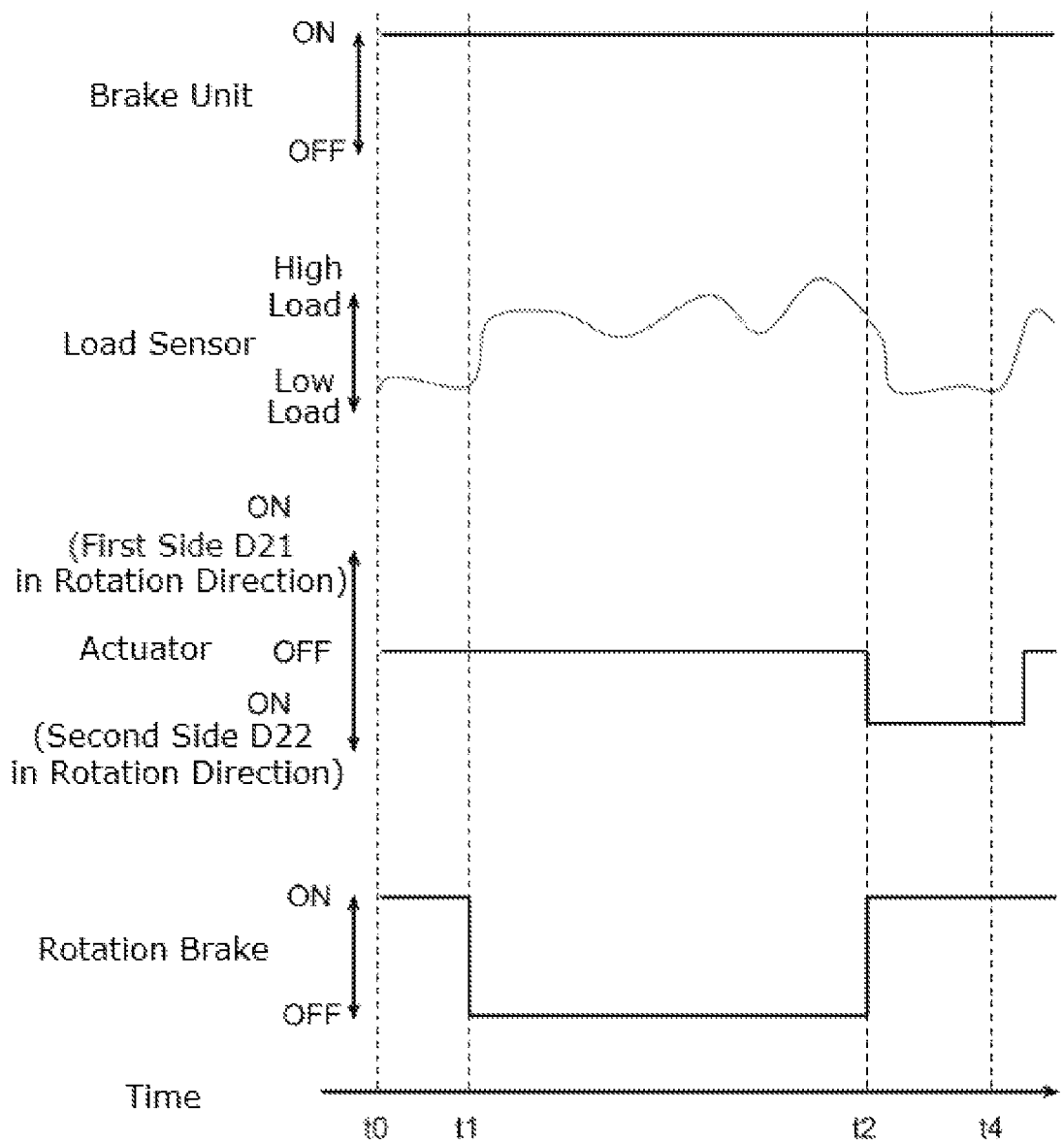
FIG. 5A illustrates how to control operations of a rotation brake and operations of an actuator and a brake unit of a target driving device in the first embodiment.
Figure 5B:
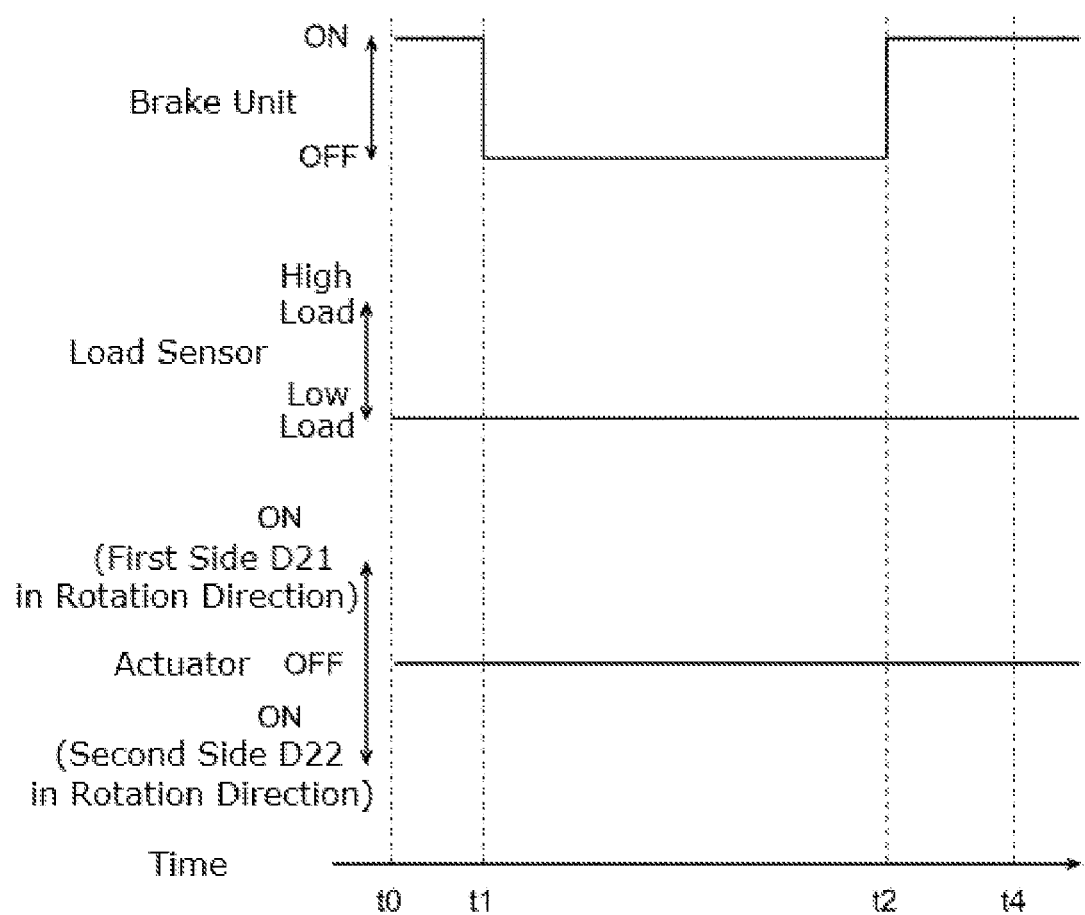
FIG. 5B illustrates how to control operations of actuators and brake units of driving devices other than the target driving device in the first embodiment.

FIG. 5A illustrates how to control operations of the rotation brake and operations of the actuator 30 and the brake unit 31 of the target driving device 2a while the backlash measuring method relating to the first embodiment is performed. FIG. 5A also shows, as an example, the load detected by the load sensor 73 for measuring the load applied by the ring gear 106 to the target pinion 4a while the backlash measuring method relating to the first embodiment is performed. FIG. 5B illustrates how to control operations of the actuators 30 and the brake units 31 of the driving devices 2 other than the target driving device 2a while the backlash measuring method relating to the first embodiment is performed. FIG. 5B also shows, as an example, the load detected by the load sensors 73 for measuring the load applied by the ring gear 106 to the pinions 4 other than the target pinion 4a while the backlash measuring method relating to the first embodiment is performed.

In the example shown in FIGS. 5A and 5B, the brake units 31 of all of the driving devices 2 are on at a time t0 prior to the start of the backlash measuring. In other words, at the time to, both the target pinion 4a and the other pinions 4 than the target pinion 4a are braked by the brake units 31. At the time t0, the rotation brake is on. In other words, at the time t0, the rotation brake is preventing the rotation of the second portion 6 relative to the ring gear 106. At the time t0, none of the actuators 30 of the driving devices 2 input rotation to the pinions 4.

The following first describes the contacting step of bringing the target tooth 41a of the target pinion 4a into contact with the ring gear 106. In the contacting step relating to the first embodiment, while the target pinion 4a is being braked by the brake unit 31 and the pinions 4 other than the target pinion 4a are free from the braking by the brake units 31, the target tooth 41a is brought into contact with the ring gear 106 using an external force designed to rotate the second portion 6 relative to the first portion 5. The external force is, for example, wind blowing to rotate the second portion 6 or nacelle 103 relative to the first portion 5 or tower 102.

In the driving mechanism 1 relating to the first embodiment, the brake units 31 of the driving devices 2 can be individually controlled. With this feature, in the contacting step, while the target pinion 4a is being braked by the brake unit 31, the pinions 4 other than the target pinion 4a can be free from the braking by the brake units 31. In the example shown in FIGS. 5A and 5B, the brake units 31 of the driving devices 2 other than the target driving device 2a are turned off at a time t1 subsequent to the time to. At the time t1, the brake unit 31 of the target driving device 2a remains turned on. Accordingly, while the target pinion 4a is being braked by the brake unit 31, the pinions 4 other than the target pinion 4a are free from the braking by the brake units 31. At the time t1, the rotation brake is turned off. As the wind turbine 10 is left under these conditions, an external force such as wind can rotate the second portion 6 relative to the first portion 5.

As the second portion 6 rotates relative to the first portion 5, the teeth 41 of the pinions 4 touch the ring gear 106. Specifically, the teeth 41 of the pinions 4 touch the teeth 107 of the ring gear 106. In the contacting step, the rotation of the second portion 6 relative to the first portion 5 results in the teeth 41 of the target pinion 4a touching the ring gear 106, so that the target tooth 41a can be determined.

As the target tooth 41a touches the ring gear 106, the ring gear 106 applies load to the target pinion 4a, which is being braked by the brake unit 31. In the contacting step relating to the first embodiment, whether the target tooth 41a touches the ring gear 106 can be detected by detecting a change in load measured by the load sensor 73. In the example shown in FIG. 5A, due to the contact between the target tooth 41a and the ring gear 106, a greater load is measured by the load sensor 73 at a time subsequent to the time t1 than at a time subsequent to the time t0 and prior to the time t1. In this case, the contact between the target tooth 41a and the ring gear 106 can be detected as an increase in load measured by the load sensor 73. In other words, the target tooth 41a can be determined to be in contact with the ring gear 106 if a greater load is measured by the load sensor 73 at a time subsequent to the time t1 than at a time subsequent to the time t0 and prior to the time t1.

The pinions 4 other than the target pinion 4a are free from the braking by the brake units 31. Accordingly, if the pinions 4 other than the target pinion 4a touch the teeth 107 of the ring gear 106, they are pushed by the teeth 107 of the ring gear 106 and resultantly rotated. Therefore, as shown in FIG. 5B, the load applied to the pinions 4 other than the target pinion 4a does not change significantly when the external force causes the second portion 6 to rotate relative to the first portion 5.

The load sensor 73 relating to the first embodiment can also detect the side in the rotation direction D2 faced by the tooth surface of the target tooth 41a that is in contact with the ring gear 106. In the contacting step, the side in the rotation direction D2 faced by the tooth surface of the target tooth 41a that is in contact with the ring gear 106, which is detected by the load sensor 73, can be defined as the first side D21 in the rotational direction.

As a result of the contacting step described above, the target tooth 41a of the target pinion 4a can touch the ring gear 106 at the tooth surface facing the first side D21 in the rotation direction, as shown in FIG. 4. In addition, the contact between the target tooth 41a and the ring gear 106 can be detected by the load sensor 73.

After the contacting step, the rotation amount calculating step is performed in order to calculate the amount of rotation of the target pinion 4a by causing the target pinion 4a to rotate toward the second side D22 in the rotation direction until the target tooth 41a touches the ring gear 106 at the tooth surface facing the second side D22 in the rotation direction. In the rotation amount calculating step relating to the first embodiment, the target pinion 4a rotates toward the second side D22 in the rotation direction since the target pinion 4a receives rotation input by the actuator 30 of the target driving device 2a.

In the rotation amount calculating step, the ring gear 106 is first braked relative to the second portion 6 while the contact between the target tooth 41a and the ring gear 106 achieved in the contacting step is maintained. In the first embodiment, the ring gear 106 is braked relative to the second portion 6 by allowing the rotation brake to prevent the rotation of the second portion 6 relative to the ring gear 106 in the rotation amount calculating step. In the example shown in FIG. 5A, the rotation brake is turned on while the contact between the target tooth 41a and the ring gear 106, which is achieved in the contacting step, is maintained. In this way, the rotation brake prevents the rotation of the second portion 6 relative to the ring gear 106, so that the ring gear 106 is braked relative to the second portion 6.

In the rotation amount calculating step relating to the first embodiment, the ring gear 106 is braked relative to the second portion 6 by allowing at least one of the pinions 4 other than the target pinion 4a to be braked by the brake unit 31. In the example shown in FIG. 5B, the brake units 31 of all of the driving devices 2 other than the target driving device 2a are turned on while the contact between the target tooth 41a and the ring gear 106, which is achieved in the contacting step, is maintained. As a result, all of the pinions 4 other than the target pinion 4a are braked by the brake units 31, so that the ring gear 106 is braked relative to the second portion 6.

In the example shown in FIGS. 5A and 5B, the rotation brake and the brake units 31 of the driving devices 2 other than the target driving device 2a are turned on at a time t2 subsequent to the time t1 and after the contact between the target tooth 41a and the ring gear 106 is detected. In this way, the rotation brake prevents the rotation of the second portion 6 relative to the ring gear 106, and all of the pinions 4 other than the target pinion 4a are braked by the brake units 31. As a result, the ring gear 106 is braked relative to the second portion 6. Although not shown, in the rotation amount calculating step while the rotation brake may prevent the rotation of the second portion 6 relative to the ring gear 106, it may not be necessary to cause the brake units 31 to brake the pinions 4 other than the target pinion 4a. In this case, the rotation brake can still brake the ring gear 106 relative to the second portion 6. Alternatively, in the rotation amount calculating step, the rotation brake may not be used to brake the ring gear 106 relative to the second portion 6, and the ring gear 106 may be braked relative to the second portion 6 by allowing at least one of the pinions 4 other than the target pinion 4a to be braked by the brake unit 31.

In the rotation amount calculating step, the amount of rotation of the target pinion 4a is calculated by causing the target pinion 4a to rotate toward the second side D22 in the rotation direction until the target tooth 41a touches the ring gear 106 at the tooth surface facing the second side D22 in the rotation direction. In the example shown in FIG. 5A, at the time t2, the brake unit 31 of the target driving device 2a remains turned on. Even if the brake unit 31 of the target driving device 2a is turned on, the target pinion 4a can be caused to rotate toward the second side D22 in the rotation direction by the actuator 30 of the target driving device 2a inputting rotation producing a greater force than the braking force of the brake unit 31. Although not shown, at the time t2, the brake unit 31 of the target driving device 2a may be turned off and the actuator 30 of the target driving device 2a may input rotation, so that the target pinion 4a may be rotated toward the second side D22 in the rotation direction. To rotate the target pinion 4a toward the second side D22 in the rotation direction, the target pinion 4a is rotated with a driving force less than the braking force applied to brake the ring gear 106 relative to the second portion 6. Thus, after rotating toward the second side D22 in the rotation direction, the target pinion 4a stops rotating once it touches the ring gear 106 at the tooth surface facing the second side D22. The dashed line indicated by the sign L1 shown in FIG. 4 presents the imaginary position reached by the target pinion 4a after rotating until the target tooth 41a touches the ring gear 106 at the tooth surface facing the second side D22 in the rotation direction.

In the example shown in FIG. 5A, at the time t2 at which the ring gear 106 is braked relative to the second portion 6, the actuator 30 of the target driving device 2a starts inputting to the target pinion 4a the rotation toward the second side D22 in the rotation direction. Although not shown, the actuator 30 of the target driving device 2a may start inputting rotation to the target pinion 4a at a time after the ring gear 106 is braked relative to the second portion 6.

In the first embodiment, the actuator 30 of the target driving device 2a can be controlled separately from the actuators 30 of the driving devices 2 other than the target driving device 2a. In the backlash measuring method relating to the first embodiment, as shown in FIGS. 5A and 5B, while the actuators 30 of the driving devices 2 other than the target driving device 2*a* are controlled to stop inputting rotation, the actuator 30 of the target driving device 2*a* is allowed to input rotation to cause the target pinion 4*a* to rotate. In this way, while the target pinion 4*a* rotates, the pinions 4 other than the target pinion 4*a* are prevented from rotating.

For example, the rotation amount calculating step is designed to calculate how much the target pinion 4*a* rotates from when the target pinion 4*a* is controlled to rotate toward the second side D22 in the rotation direction so that the tooth surface of the target tooth 41*a* facing the first side D21 in the rotation direction moves away from the ring gear 106 to when the target tooth 41*a* touches the ring gear 106 at the tooth surface facing the second side D22 in the rotation direction. The rotation amount calculating step relating to the first embodiment detects whether the target tooth 41*a* touches the ring gear 106. Whether the target tooth 41*a* touches the ring gear 106 can be detected, for example, by detecting a change in load measured by the load sensor 73. More specifically, the contact between the target tooth 41*a* and the ring gear 106 on the tooth surface facing the second side D22 in the rotation direction can be detected as a change in load measured by the load sensor 73.

In the example shown in FIG. 5A, at a time subsequent to the time t2, the load measured by the load sensor 73 drops. Therefore, at the time t2, it can be determined that the tooth surface of the target tooth 41*a* facing the first side D21 in the rotation direction has started moving away from the ring gear 106.

In the example shown in FIG. 5A, at a time subsequent to the time t2, the load measured by the load sensor 73 rises. More specifically, the load measured by the load sensor 73 starts rising at a time t4 after the time t2. In this case, it can be deemed that the target tooth 41*a* may touch the ring gear 106 at the tooth surface facing the first side D21 in the rotation direction at the time t4.

In the above-described manner, in the example shown in FIG. 5A, how much the target pinion 4*a* rotates from when the tooth surface of the target tooth 41*a* facing the first side D21 in the rotation direction moves away from the ring gear 106 to when the target tooth 41*a* touches the ring gear 106 at the tooth surface facing the second side D22 in the rotation direction is calculated by calculating the amount of rotation made by the target pinion 4*a* within a period from the time t2 to the time t4.

In the first embodiment, the rotation amount calculating step calculates the amount of rotation of the target pinion 4*a* based on the measured amount of input rotation transmitted from the actuator 30 to the speed reducer 32. More specifically, the amount of rotation of the target pinion 4*a* is calculated based on the measured amount of input rotation transmitted from the actuator 30 of the target driving device 2*a* to the speed reducer 32 of the target driving device 2*a*.

In the example shown in FIG. 3, the driving devices 2 each include a rotation sensor 34 for measuring the amount of input rotation transmitted from the actuator 30 of the target driving device 2*a* to the speed reducer 32 of the target driving device 2*a*. The rotation sensor 34 is configured to measure, as the amount of input rotation transmitted from the actuator 30 of the target driving device 2*a* to the speed reducer 32 of the target driving device 2*a*, the amount of rotation of the second shaft portion 33*b* of the shaft 33 shown in FIG. 3. In the example shown in FIG. 3, the rotation sensor 34 measures the amount of rotation of a portion of the second shaft portion 33*b* of the shaft 33 that is located between the actuator 30 and the brake unit 31.

The amount of rotation of the target pinion 4*a* can be calculated based on, for example, the measured amount of input rotation transmitted from the actuator 30 to the speed reducer 32 in the period from the time t2 to the time t4, the backlash inside the speed reducer 32, and the reduction ratio of the speed reducer 32.

The rotation sensor 34 can be considered to be part of the rotation amount calculating unit 71 of the backlash measuring apparatus 7 described above. In this case, the rotation amount calculating unit 71 can use the rotation sensor 34 to calculate the amount of rotation of the target pinion 4*a*.

In another example of the backlash measuring method relating to the first embodiment, the rotation amount calculating step may calculate the amount of rotation of the target pinion 4*a* using a sensor that is configured to directly measure the amount of rotation of the target pinion 4*a*. In this case, the sensor configured to directly measure the amount of rotation of the target pinion 4*a* can be considered to be part of the rotation amount calculating unit 71 of the backlash measuring apparatus 7 described above.

After the rotation amount calculating step, the measuring step is performed to measure the backlash between the ring gear 106 and the target pinion 4*a*. In the measuring step relating to the first embodiment, the backlash can be measured by calculating the backlash based on the amount of rotation of the target pinion 4*a*, which is calculated in the rotation amount calculating step. In the measuring step relating to the first embodiment, the amount of rotation of the target pinion 4*a*, which is calculated in the rotation amount calculating step, is used to measure normal backlash or the width w1 indicated in FIG. 4. The measuring step of measuring the backlash can be performed by the measuring unit 72 of the measuring apparatus 7. The measuring unit 72 is formed by, for example, a processor such as a central processing unit (CPU) that is configured to execute a program to calculate the backlash based on the amount of rotation of the target pinion 4*a*, which is calculated in the rotation amount calculating step.

The backlash measuring method relating to the first embodiment includes: the contacting step of bringing the target tooth 41*a* of the target pinion 4*a* into contact with the ring gear 106 at the tooth surface facing the first side D21 in the rotation direction of the target pinion 4*a*; the rotation amount calculating step of calculating the amount of rotation of the target pinion 4*a*; and the measuring step of measuring the backlash between the ring gear 106 and the target pinion 4*a* based on the amount of rotation of the target pinion 4*a* calculated in the rotation amount calculating step. In the rotation amount calculating step, the rotation amount can be calculated in the following manner. The ring gear 106 is braked relative to the second portion 6 while the contact between the target tooth 41*a* and the ring gear 106, which is established in the contacting step, is maintained. Subsequently, the target pinion 4*a* is rotated toward the second side D22 in the rotation direction with a driving force less than the braking force applied to brake the ring gear 106 relative to the second portion 6 until the target tooth 41*a* touches the ring gear 106 at the tooth surface facing the second side D22 in the rotation direction. The backlash measuring apparatus 7 relating to the first embodiment includes the rotation amount calculating unit 71 and the measuring unit 72. The backlash measuring method and backlash measuring apparatus 7 described above can be used to measure the backlash between the ring gear 106 and the pinions 4 in the wind turbine 10 including the ring gear 106 and the driving devices 2 having the pinions 4 meshing with the ring gear 106. It should be particularly noted that the backlash measuring method relating to the first embodiment can be used to measure the backlash between the ring gear 106 and the pinions 4 without having to stop the operation of the wind turbine 10 and disassemble the wind turbine 10. Therefore, the backlash measuring method relating to the first embodiment can be used to readily collect backlash data including the values of backlash measured at a plurality of different times.

The backlash measuring method relating to the first embodiment can be applied to the driving mechanism 1, which includes the driving devices 2 respectively including the pinions 4 meshing with the ring gear 106. In this case, the backlash measuring method is used to measure the backlash between the ring gear 106 and the target pinion 4a, which is one of the pinions 4 of the driving devices 2. Even when the driving mechanism 1 includes more than one driving device 2, the backlash measuring method relating to the first embodiment can be also used to measure the backlash between the ring gear 106 and the target pinion 4a, which is one of the pinions 4 of the driving devices 2.

According to an example of the backlash measuring method relating to the first embodiment, the amount of rotation of the target pinion 4a is calculated in the rotation amount calculating step based on the measured amount of input rotation transmitted from the actuator 30 to the speed reducer 32. In this manner, the amount of input rotation is measured before the rotation is reduced by the speed reducer 32. Therefore, the amount of input rotation can be measured with required accuracy even if a low-resolution sensor is used as the rotation sensor 34 for measuring the amount of input rotation. In the first embodiment, the rotation sensor 34 is used to measure the amount of rotation of the second shaft portion 33b of the shaft 33 as the amount of input rotation. The second shaft portion 33b is positioned on the actuator 30 side with respect to the speed reducer 32, and is rotating at a speed that is achieved before reduced by the speed reducer 32. For this reason, the second shaft portion 33b rotates more than the first shaft portion 33a, which is positioned on the pinion 4 side with respect to the speed reducer 32. Since the rotation sensor 34 is arranged to measure the amount of rotation of the second shaft portion 33b as the amount of input rotation, required accuracy can be more reliably achieved than when the amount of rotation of the first shaft portion 33a is measured even if a low-resolution sensor is used as the rotation sensor 34.

In the backlash measuring method relating to the first embodiment, at least one of the contacting step and the rotation amount calculating step is configured to detect a change in load measured by the load sensor 73, which is configured to measure the load applied to the target pinion 4a by the ring gear 106, in order to detect whether the target tooth 41a touches the ring gear 106. The backlash measuring apparatus 7 relating to the first embodiment further includes the load sensor 73 for measuring the load applied by the ring gear 106 to the target pinion 4a. This characteristic configuration produces the following advantageous effects. The load applied by the ring gear 106 to the target pinion 4a can be alternatively measured by detecting whether the current flowing through the actuator 30 increases or decreases. If the load is measured by detecting whether the current flowing through the actuator 30 increases or decreases, however, the change in load can be detected only in a case where current is flowing through the actuator 30. To overcome this drawback, the backlash measuring apparatus 7 includes the load sensor 73, and the backlash measuring method is performed using the load sensor 73 configured to measure the load applied by the ring gear 106 to the target pinion 4a. In this way, the contact between the target tooth 41a of the target pinion 4a and the ring gear 106 can be detected and the backlash can be measured even in a case where no current flows through the actuator 30.

In the contacting step of the backlash measuring method relating to the first embodiment, while the target pinion 4a is being braked by the brake unit 31 and the pinions 4 other than the target pinion 4a are free from the braking by the brake units 31, the target tooth 41a is brought into contact with the ring gear 106 using an external force designed to rotate the second portion 6 relative to the first portion 5. This characteristic configuration produces the following advantageous effects. The target tooth 41a is brought into contact with the ring gear 106 in the contacting step alternatively by causing the actuator 30 of the target driving device 2a to rotate the target pinion 4a. In order to employ this alternative method, it is required to rotate the target pinion 4a while the pinions 4 other than the target pinion 4a are suspended from rotating. To do so, it is necessary to allow the actuator 30 of the target driving device 2a to input rotation while the actuators 30 of the driving devices 2 other than the target driving device 2a are controlled to stop inputting rotation. For this purpose, the sequential control of the actuators 30 needs to include a sequence that enables the actuator 30 of the target driving device 2a to be separately driven. According to the characteristic configuration described above, on the other hand, an external force such as wind imparted to the wind turbine 10 is used to bring the teeth 41 of the pinions 4 into contact with the ring gear 106. In this way, the contacting step can be performed without requiring a sequence that is designed to drive the actuator 30 of the target driving device 2a separately.

In the rotation amount calculating step of the backlash measuring method relating to the first embodiment, the actuator 30 is used to rotate the target pinion 4a toward the second side D22 in the rotation direction. Since the target pinion 4a can be driven by the actuator 30 in the rotation amount calculating step, the target tooth 41a can be brought into contact with the ring gear 106 in a stable manner without relying on an external force such as wind imparted to the wind turbine 10.

In an example of the backlash measuring method relating to the first embodiment, the ring gear 106 is braked relative to the second portion 6 in the rotation amount calculating step by using the rotation brake to prevent the rotation of the second portion 6 relative to the ring gear 106. Since the ring gear 106 is braked relative to the second portion 6, the ring gear 106 may be braked relative to the second portion 6 more reliably than when only at least one of the pinions 4 other than the target pinion 4a is braked by the brake unit 31.

According to an example of the backlash measuring method relating to the first embodiment, the ring gear 106 is braked relative to the second portion 6 by allowing at least one of the pinions 4 other than the target pinion 4a to be braked by the brake unit 31. Here, all of the pinions 4 other than the target pinion 4a may be braked by the brake units 31, to brake the ring gear 106 relative to the second portion 6. In this case, the rotation brake is no longer required to brake the ring gear 106 relative to the second portion 6.

While the foregoing has described the first embodiment through specific examples, these specific examples are not intended to limit the first embodiment. The foregoing first embodiment can be implemented in various other specific forms and is susceptible to omission, replacement, modification and addition of various elements thereof within the purport of the invention.

With reference to the appended drawings, the following describes modification examples. In the following description and the drawings used therein, parts that can be configured in a similar manner to those in the foregoing specific examples are denoted by the same reference signs as those in the foregoing specific examples and are not described again.

First Modification Example

Figure 6A:
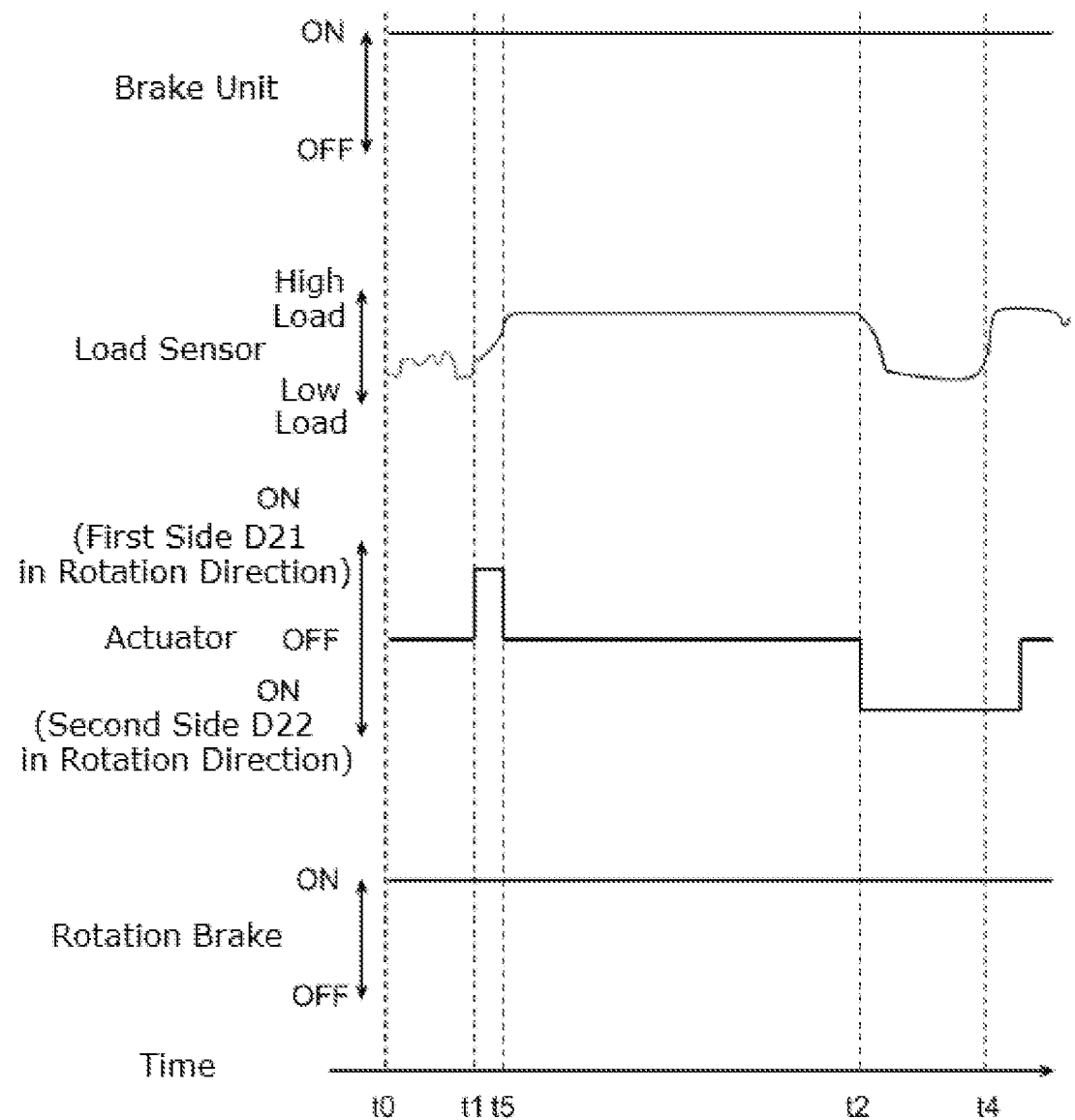
FIG. 6A illustrates how to control operations of a rotation brake and operations of an actuator and a brake unit of a target driving device in a first modification example.
Figure 6B:
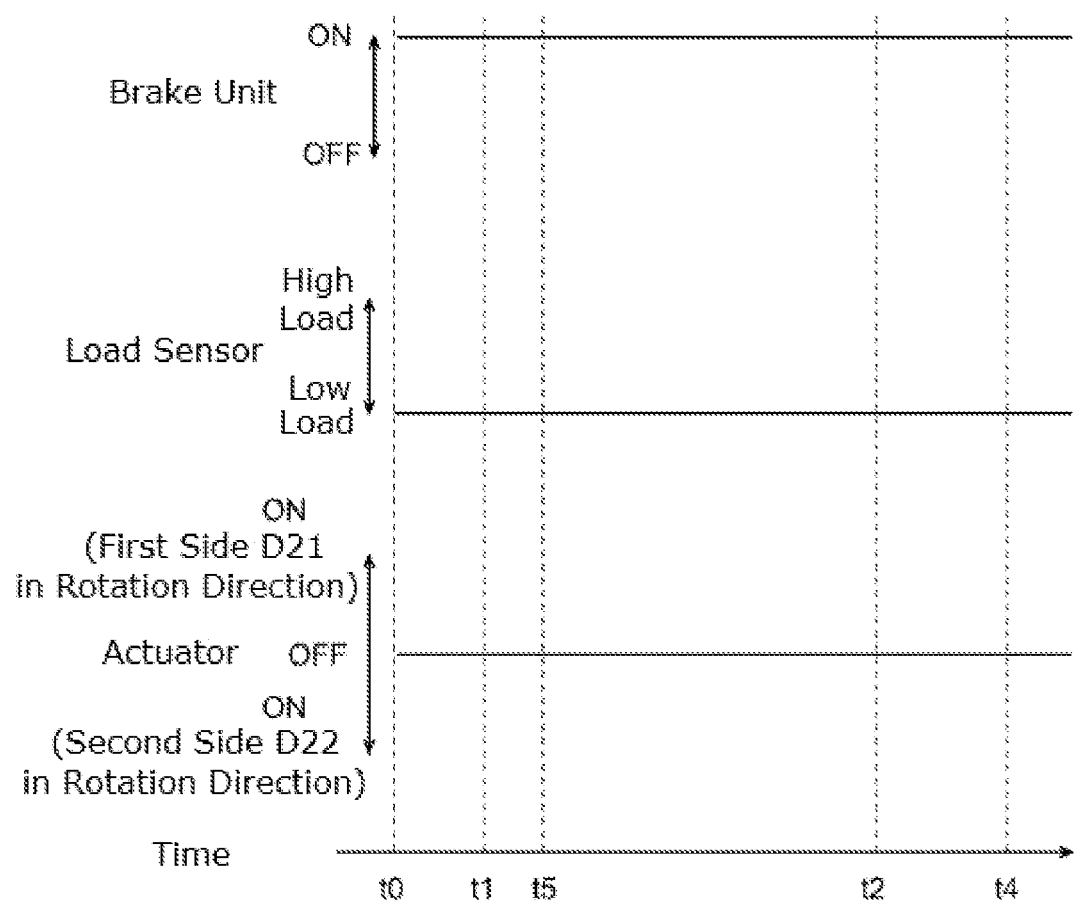
FIG. 6B illustrates how to control operations of actuators and brake units of driving devices other than the target driving device in the first modification example.

According to the backlash measuring method relating to the foregoing first embodiment, in the contacting step, the target tooth 41a is brought into contact with the ring gear 106 using an external force designed to rotate the second portion 6 relative to the first portion 5. The first embodiment, however, is not limited to such, and the target tooth 41a can be brought into contact with the ring gear 106 in the contacting step in any other manners. FIG. 6A illustrates how to control operations of the rotation brake and operations of the actuator 30 and the brake unit 31 of the target driving device 2a while a backlash measuring method relating to a first modification example is performed. FIG. 6A also shows, as an example, the load detected by the load sensor 73 for measuring the load applied by the ring gear 106 to the target pinion 4a while the backlash measuring method relating to the first modification example is performed. FIG. 6B illustrates how to control operations of the actuators 30 and the brake units 31 of the driving devices 2 other than the target driving device 2a while the backlash measuring method relating to the first modification example is performed. FIG. 6B also shows, as an example, the load detected by the load sensor 73 for measuring the load applied by the ring gear 106 to any one of the pinions 4 other than the target pinion 4a while the backlash measuring method relating to the first modification example is performed.

In the contacting step relating to the first modification example, the target tooth 41a is brought into contact with the ring gear 106 by causing the actuator 30 of the target driving device 2a to rotate the target pinion 4a while the ring gear 106 is braked relative to the second portion 6. In the first modification example, the actuators 30 of the driving devices 2 can be individually controlled. Due to this characteristic configuration, in the contacting step, the actuator 30 of the target driving device 2a is allowed to input rotation while the actuators 30 of the driving devices 2 other than the target driving device 2a are controlled to stop inputting rotation. In the example shown in FIGS. 6A and 6B, at the time t1, the brake unit 31 of the target driving device 2a remains turned on. Even if the brake unit 31 of the target driving device 2a is turned on, the target pinion 4a can be rotated if the actuator 30 of the target driving device 2a inputs rotation producing a greater force than the braking force applied by the brake unit 31. Although not shown, at the time t1, the actuator 30 of the target driving device 2a may input rotation while the brake unit 31 of the target driving device 2a is turned off so that the target pinion 4a is released from the braking by the brake unit 31. At the time t1, the rotation brake remains turned on. At the time t1, the brake units 31 of the driving devices 2 other than the target driving device 2a remain turned on. As a result, at the time t1, the ring gear 106 is braked relative to the second portion 6. The first modification example is not limited to the example shown in FIGS. 6A and 6B, and the ring gear 106 can be braked relative to the second portion 6 in the contacting step in any other manners. For example, in the contacting step, the rotation brake may be used to prevent the rotation of the second portion 6 relative to the ring gear 106, and it may not be necessary to use the brake units 31 to brake the pinions 4 other than the target pinion 4a. In this case, the rotation brake can brake the ring gear 106 relative to the second portion 6. Alternatively, in the contacting step, the rotation brake may not be used to brake the ring gear 106 relative to the second portion 6. The ring gear 106 may be braked relative to the second portion 6 by allowing at least one of the pinions 4 other than the target pinion 4a to be braked by the brake unit 31.

In the contacting step relating to the first modification example, the target pinion 4a is rotated by the actuator 30 while the above-described conditions are maintained. As the actuator 30 is driven to rotate the target pinion 4a toward the first side D21 in the rotation direction, the target tooth 41a of the target pinion 4a can touch the ring gear 106 at the tooth surface facing the first side D21 in the rotation direction of the target pinion 4a.

As in the first embodiment, in the first modification example, the contacting step is configured to detect a rise in load measured by the load sensor 73 in order to detect whether the target tooth 41a touches the ring gear 106. In the contacting step relating to the first modification example, after it is detected that the target tooth 41a touches the ring gear 106, the actuator 30 of the target driving device 2a is suspended from inputting to the target pinion 4a the rotation toward the first side D21 in the rotation direction. In the example shown in FIG. 6A, at a time t5 subsequent to the time t1, the actuator 30 of the target driving device 2a is suspended from inputting the rotation to the target pinion 4a. In the backlash measuring method relating to the first modification example, the rotation amount calculating step starts at a time after the time t5.

In the contacting step relating to the first modification example, the target tooth 41a is brought into contact with the ring gear 106 by controlling the actuator to rotate the target pinion 4a. Since the target pinion 4a is driven by the actuator the target tooth 41a can be brought into contact with the ring gear 106 in a stable manner without relying on an external force such as wind imparted to the wind turbine 10.

Second Modification Example

According to the first embodiment described above, when the target tooth 41a is in contact with the ring gear 106, the load sensor 73 can detect the side faced by the tooth surface of the target tooth 41a in the rotation direction D2 that is in contact with the ring gear 106. When the target tooth 41a is in contact with the ring gear 106, however, the load sensor 73 may not be required to be capable of detecting the side faced by the tooth surface of the target tooth 41a in the rotation direction D2 that is in contact with the ring gear 106. A backlash measuring method relating to a second modification example can still perform the contacting step even if the load sensor 73 is not configured to be capable of detecting the side faced by the tooth surface of the target tooth 41a in the rotation direction D2 that is in contact with the ring gear 106.

Figure 7A:
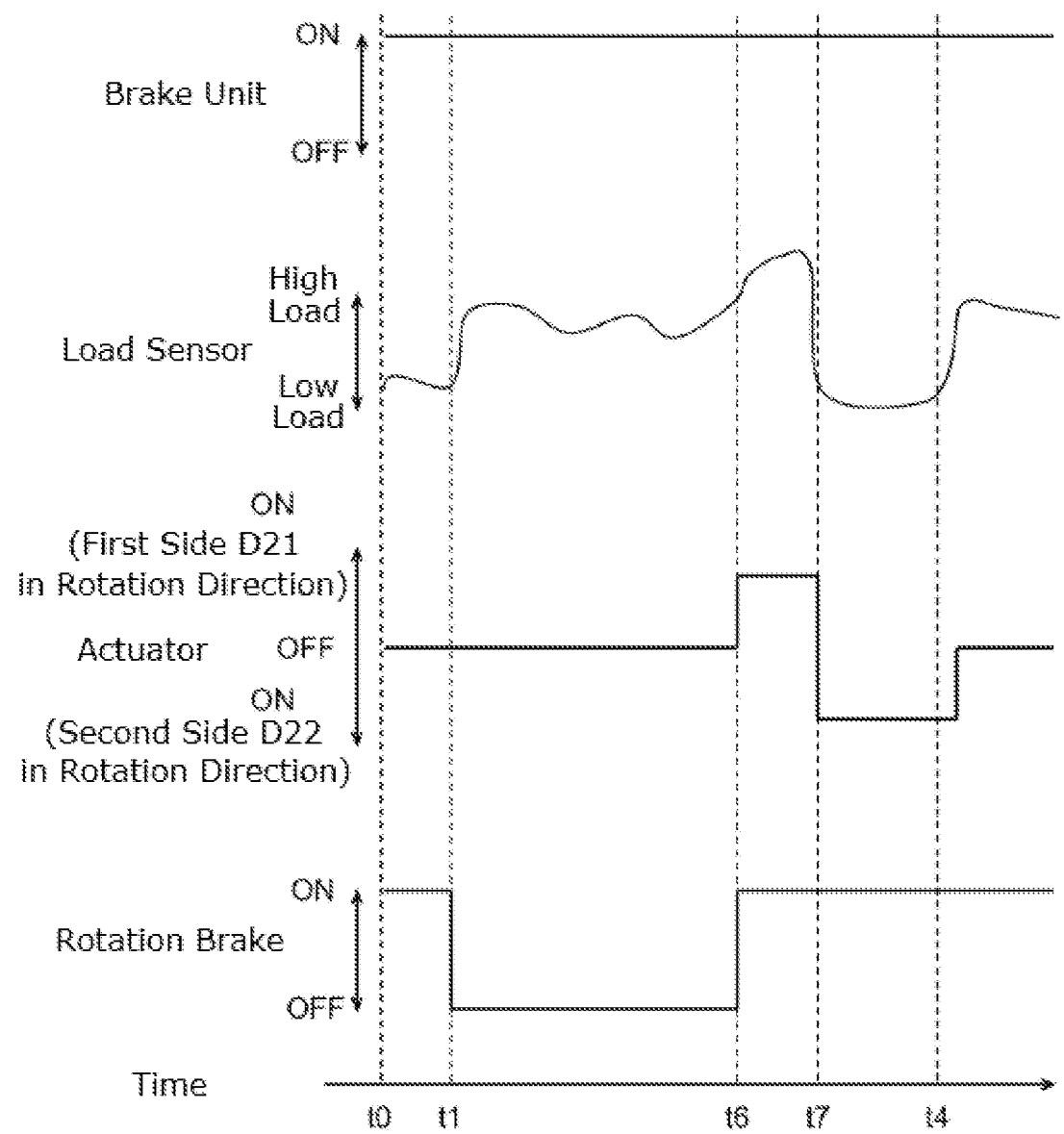
FIG. 7A illustrates how to control operations of a rotation brake and operations of an actuator and a brake unit of a target driving device in a second modification example.
Figure 7B:
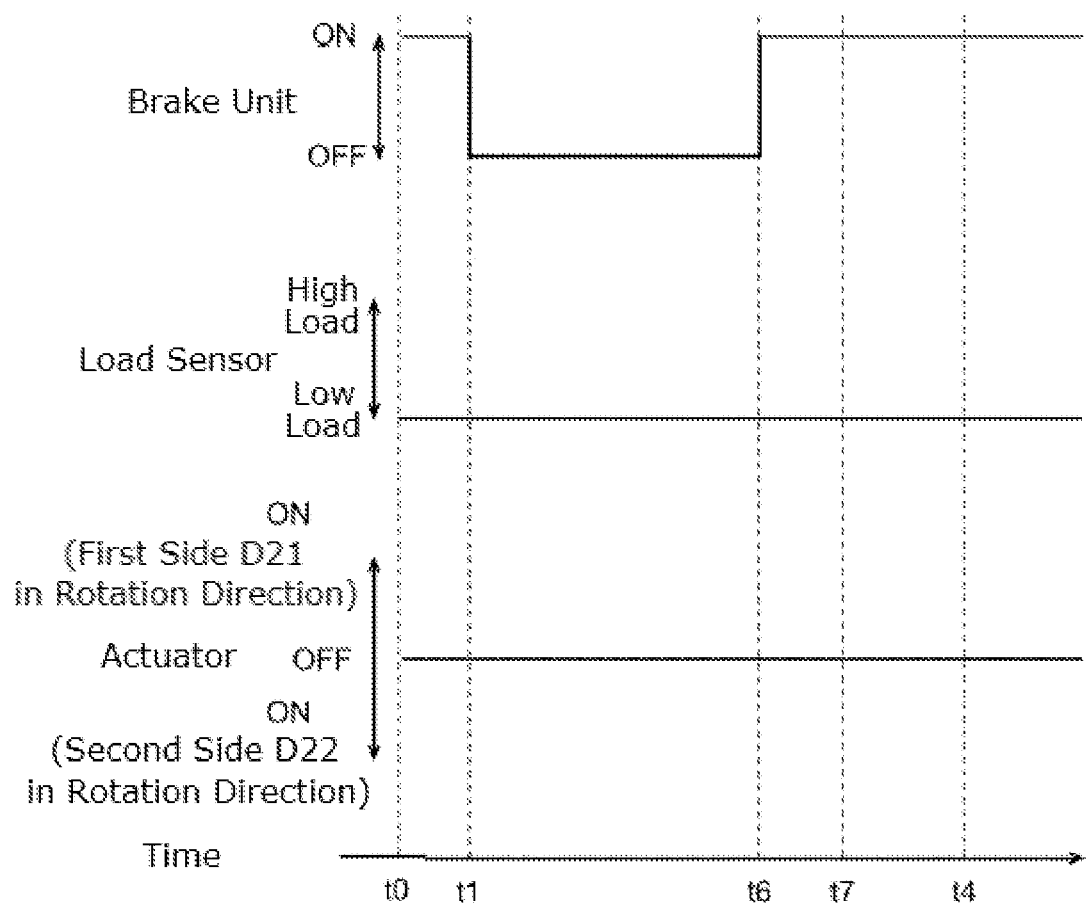
FIG. 7B illustrates how to control operations of actuators and brake units of driving devices other than the target driving device in the second modification example.

FIG. 7A illustrates how to control operations of the rotation brake and operations of the actuator 30 and the brake unit 31 of the target driving device 2a while the backlash measuring method relating to the second modification example is performed. FIG. 7A also shows, as an example, the load detected by the load sensor 73 for measuring the load applied by the ring gear 106 to the target pinion 4a while the backlash measuring method relating to the second modification example is performed. FIG. 7B illustrates how to control operations of the actuators 30 and the brake units 31 of the driving devices 2 other than the target driving device 2a while the backlash measuring method relating to the second modification example is performed. FIG. 7B also shows, as an example, the load detected by the load sensor 73 for measuring the load applied by the ring gear 106 to any one of the pinions 4 other than the target pinion 4a while the backlash measuring method relating to the second modification example is performed.

The contacting step relating to the second modification example includes a detecting step, an inputting step and an identifying step. In the detecting step, whether the target tooth 41a touches the ring gear 106 can be detected by detecting a change in load measured by the load sensor 73. In the inputting step, if the load sensor 73 detects that the target tooth 41a touches the ring gear 106 in the detecting step, the actuator 30 inputs to the target pinion 4a rotation toward one of the sides in the rotation direction D1 of the target pinion 4a. In the identifying step, if the rotation input in the inputting step causes a rise in load measured by the load sensor 73, the side toward which the rotation input in the inputting step is directed is identified as the first side D21 in the rotation direction, which is faced by the tooth surface of the target tooth 41a that is in contact with the ring gear 106.

The contacting step relating to the second modification example is the same as the contacting step relating to the first embodiment. While the target pinion 4a is being braked by the brake unit 31 and the pinions 4 other than the target pinion 4a are free from the braking by the brake units 31, the target tooth 41a is brought into contact with the ring gear 106 using an external force designed to rotate the second portion 6 relative to the first portion 5.

In the contacting step relating to the second modification example, whether the target tooth 41a touches the ring gear 106 is detected in the detecting step by detecting a change in load measured by the load sensor 73. In the second modification example, whether the target tooth 41a touches the ring gear 106 is detected in the detecting step using the load sensor 73 in the same manner as in the contacting step relating to the first embodiment, where the load sensor 73 is used to detect whether the target tooth 41a touches the ring gear 106. In other words, the contacting step relating to the second modification example is similarly configured to detect a rise in load measured by the load sensor 73 in order to detect whether the target tooth 41a touches the ring gear 106, as in the contacting step relating to the first embodiment.

When the load sensor 73 detects that the target tooth 41a touches the ring gear 106 in the detecting step, the inputting step is performed where the actuator 30 inputs to the target pinion 4a the rotation toward one of the sides in the rotation direction D1 of the target pinion 4a. In the example shown in FIG. 7A, at a time t6 subsequent to the time t1, the actuator 30 of the target driving device 2a inputs into the target pinion 4a rotation toward one of the sides in the rotation direction D1 of the target pinion 4a. In the example shown in FIG. 7A, at the time t6, the brake unit 31 of the target driving device 2a remains turned on. Even if the brake unit 31 of the target driving device 2a is turned on, the target pinion 4a can be rotated if the actuator 30 of the target driving device 2a inputs rotation of a greater force than the braking force applied by the brake unit 31. Although not shown, at the time t6, the brake unit 31 of the target driving device 2a is turned off, and the actuator 30 of the target driving device 2a inputs rotation, so that the target pinion 4a may be rotated.

In the inputting step, the actuator 30 of the target driving device 2a inputs rotation to the target pinion 4a while the ring gear 106 is being braked relative to the second portion 6. In the example shown in FIG. 7A, the rotation brake and the brake units 31 of the driving devices 2 other than the target driving device 2a are turned on at the time t6. In this way, the rotation brake prevents the rotation of the second portion 6 relative to the ring gear 106, and all of the pinions 4 other than the target pinion 4a are braked by the braking units 31. As a result, at the time t6, the ring gear 106 is braked relative to the second portion 6.

In the identifying step, if the rotation input in the inputting step causes a rise in load measured by the load sensor 73, the side toward which the rotation input in the inputting step is directed is identified as the first side D21 in the rotation direction, which is faced by the tooth surface of the target tooth 41a that is in contact with the ring gear 106. In the example shown in FIG. 7A, at the time t6, the actuator starts inputting into the target pinion 4a rotation toward one of the sides in the rotation direction D1 of the target pinion 4a, as a result of which the load applied to the target pinion 4a starts rising after the time t6. The rise in load applied to the target pinion 4a may be explained as follows. Since the target tooth 41a is in contact with the ring gear 106 at the tooth surface facing the side toward which the rotation input in the inputting step is directed, the rotation input to the target pinion 4a causes the target tooth 41a to be pressed against the ring gear 106 at the contacting site. Therefore, if the load applied to the target pinion 4a rises as shown in FIG. 7A, the side toward which the rotation input in the inputting step is directed can be identified as the first side D21 in the rotation direction, which is faced by the tooth surface of the target tooth 41a that is in contact with the ring gear 106.

In the backlash measuring method relating to the second modification example, the rotation amount calculating step starts at a time after the identifying step is completed. In the rotation amount calculating step, the amount of rotation of the target pinion 4a is calculated by causing the target pinion 4a to rotate toward the second side D22 in the rotation direction, which is opposite to the first side D21 in the rotation direction identified in the identifying step, until the target tooth 41a touches the ring gear 106 at the tooth surface facing the second side D22 in the rotation direction. In the example shown in FIG. 7A, at a time t7 subsequent to the time t6, the direction of the rotation input by the actuator 30 into the target pinion 4a is switched from the first side D21 to the second side D22 in the rotation direction. In this way, the target pinion 4a can be rotated toward the second side D22 in the rotation direction to calculate the amount of rotation of the target pinion 4a.

The contacting step relating to the second modification example includes the detecting step, inputting step and identifying step described above. With this characteristic configuration, even if the load sensor 73 is not capable enough to detect the side faced by the tooth surface of the target tooth 41a in the rotation direction D2 that is in contact with the ring gear 106, it is still possible to identify the side faced by the tooth surface of the target pinion 4a in the rotation direction D2 that is in contact with the ring gear 106. In the second modification example, a bolt sensor can be used as the load sensor 73. The bolt sensor is capable of measuring the amount of strain of the bolts 35 used to fixedly attach the target driving device 2a including the target pinion 4a to the nacelle 103. The amount of strain herein refers to the amount of deformation. The bolt sensor is included in at least one of the bolts 35. When the target tooth 41a of the target pinion 4a touches the ring gear 106, the ring gear 106 applies load to the target pinion 4a, which in turn strains the bolts 35. Therefore, the bolt sensor is used as the load sensor 73 to measure the amount of strain of the bolts 35, thereby measuring the load applied by the ring gear 106 to the target pinion 4a. When the bolt sensor is used as the load sensor 73, the load sensor 73 (bolt sensor) can be readily attached to the already-assembled wind turbine 10.

Third Modification Example

Figure 8A:
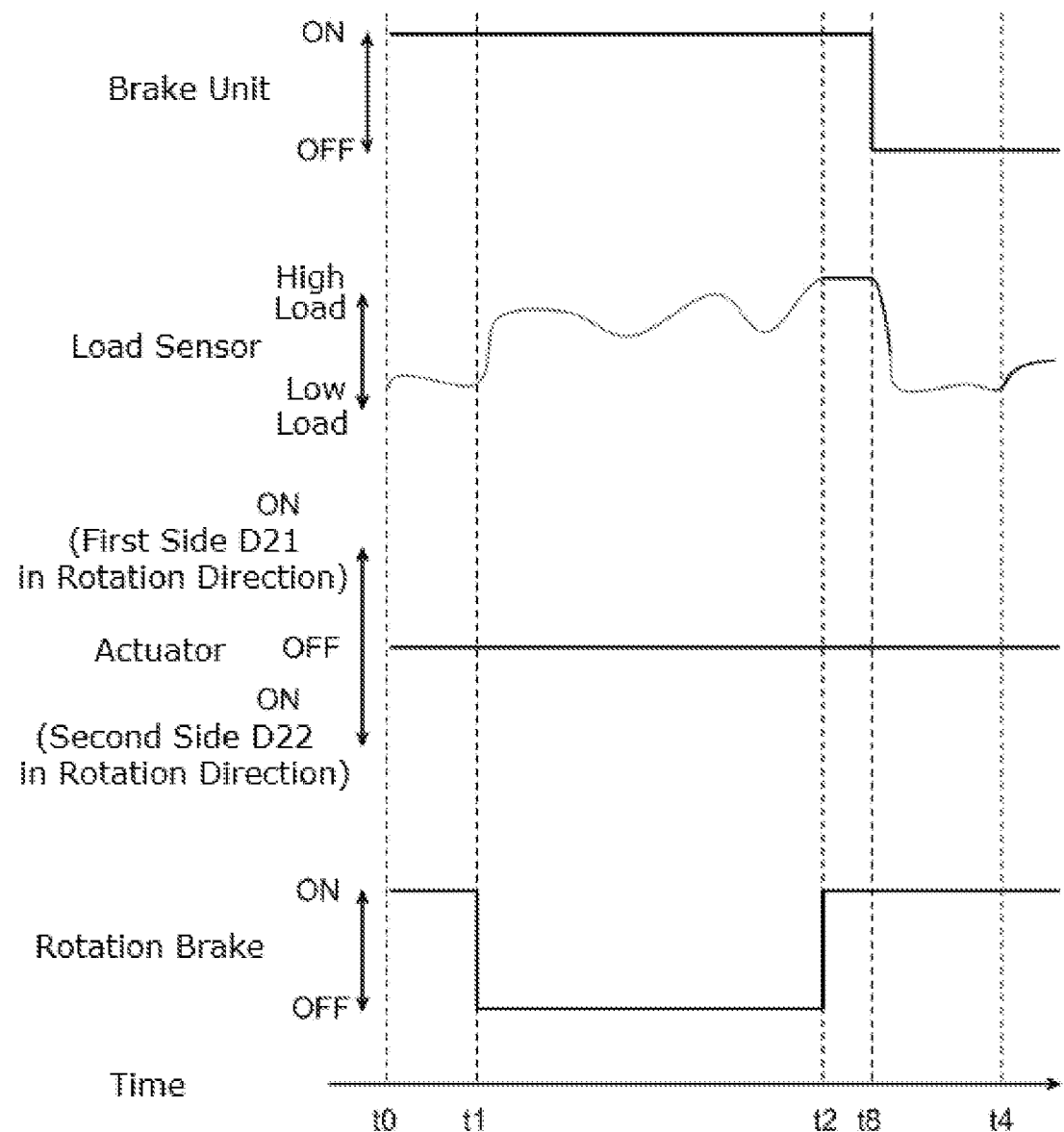
FIG. 8A illustrates how to control operations of a rotation brake and operations of an actuator and a brake unit of a target driving device in a third modification example.
Figure 8B:
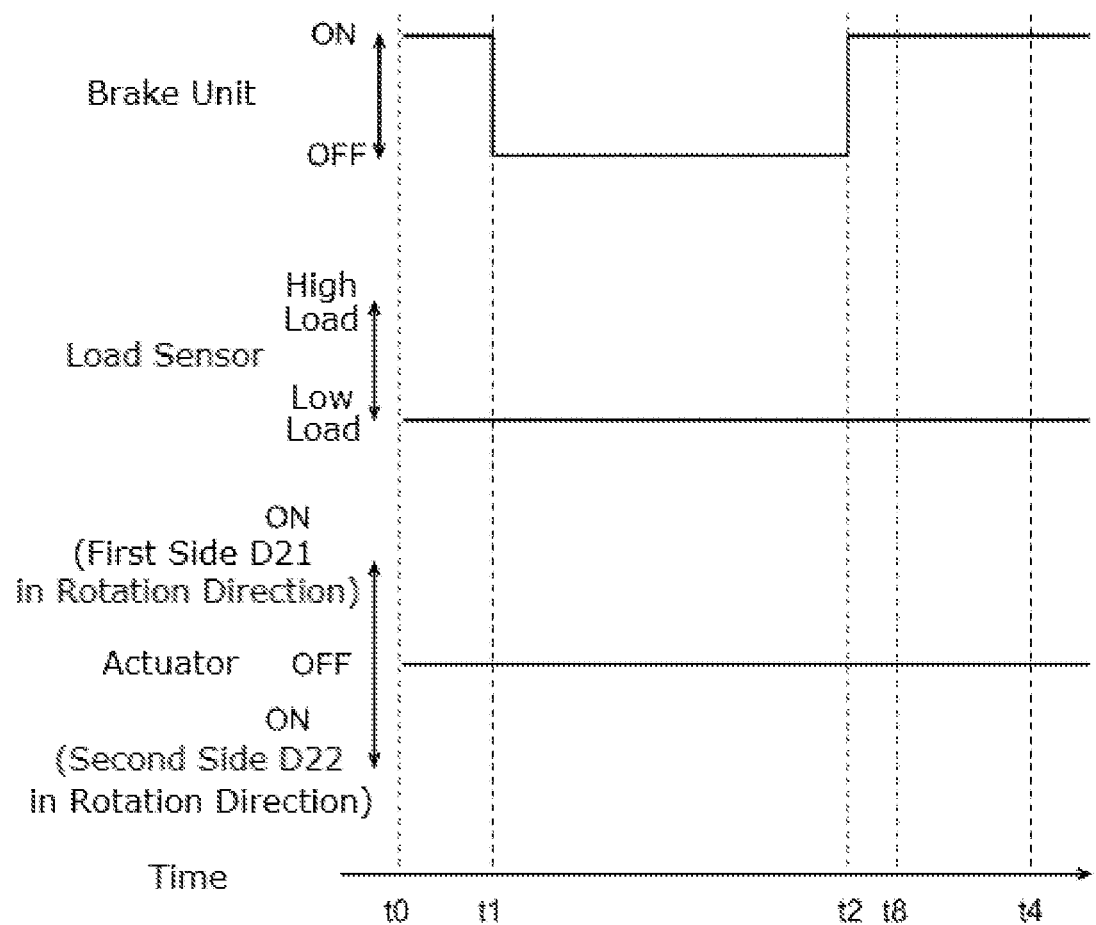
FIG. 8B illustrates how to control operations of actuators and brake units of driving devices other than the target driving device in the third modification example.

According to the above-described first embodiment and modification examples, in the rotation amount calculating step, the target pinion 4a is rotated by the rotation input by the actuator 30 of the target driving device 2a. The target pinion 4a, however, can be rotated in the rotation amount calculating step in any other manners. FIG. 8A illustrates how to control operations of the rotation brake and operations of the actuator 30 and the brake unit 31 of the target driving device 2a while a backlash measuring method relating to a third modification example is performed. FIG. 8A also shows, as an example, the load detected by the load sensor 73 for measuring the load applied by the ring gear 106 to the target pinion 4a while the backlash measuring method relating to the third modification example is performed. FIG. 8B illustrates how to control operations of the actuators 30 and the brake units 31 of the driving devices 2 other than the target driving device 2a while the backlash measuring method relating to the third modification example is performed. FIG. 8B also shows, as an example, the load detected by the load sensor 73 for measuring the load applied by the ring gear 106 to any one of the pinions 4 other than the target pinion 4a while the backlash measuring method relating to the third modification example is performed.

In the contacting step relating to the third modification example, the target tooth 41a is brought into contact with the ring gear 106 so that the target pinion 4a is pressed by the ring gear 106, and the target pinion 4a is braked by the brake unit 31. In this way, the target tooth 41a remains in contact with the ring gear 106.

According to the example shown in FIGS. 8A and 8B, as in the first embodiment, the contacting step is designed to, while the target pinion 4a is being braked by the brake unit 31 and the pinions 4 other than the target pinion 4a are free from the braking by the brake units 31, bring the target tooth 41a into contact at the tooth surface facing the first side D21 in the rotation direction with the ring gear 106 using an external force designed to rotate the second portion 6 relative to the first portion 5.

In the third modification example, the target pinion 4a is braked by the brake unit 31 while the target tooth 41a is in contact with the ring gear 106 and the target pinion 4a is pressed against the ring gear 106. In addition, the ring gear 106 is braked relative to the second portion 6. In this way, the target tooth 41a remains in contact with the ring gear 106 and the target pinion 4a remains pressed against the ring gear 106. For example, in a case where the load sensor 73 is configured to detect whether the target tooth 41a touches the ring gear 106, the target tooth 41a can be determined to be in contact with the ring gear 106 and the target pinion 4a can be determined to be pressed against the ring gear 106 if the load measured by the load sensor 73 reaches a certain level or greater. Note that, since the target tooth 41a touches the ring gear 106 at the tooth surface facing the first side D21 in the rotation direction in the contacting step, the target pinion 4a is pressed against the ring gear 106 toward the first side D21 in the rotation direction.

FIGS. 8A and 8B show a case where, at a time t2 subsequent to the time at which it is detected that the target tooth 41a touches the ring gear 106, the target tooth 41a is determined to be in contact with the ring gear 106 and the target pinion 4a is determined to be pressed against the ring gear 106. As shown in FIG. 8A, at the time t2, the target pinion 4a is braked by the brake unit 31. At the time t2, the rotation brake and the brake units 31 of the driving devices 2 other than the target driving device 2a are turned on. In this way, the rotation brake prevents the rotation of the second portion 6 relative to the ring gear 106, and all of the pinions 4 other than the target pinion 4a are braked by the brake units 31. As a result, at the time t2, the ring gear 106 is braked relative to the second portion 6. In the above-described manner, while the target tooth 41a is in contact with the ring gear 106 and the target pinion 4a is pressed against the ring gear 106, the target pinion 4a can be braked by the brake unit 31, so that the ring gear 106 can be braked relative to the second portion 6.

In the rotation amount calculating step relating to the third modification example, the brake unit 31 stops braking the target pinion 4a so that the target pinion 4a is released from being pressed against the ring gear 106. This creates a restoring force that in return rotates the target pinion 4a toward the second side D22 in the rotation direction. As described above, in the contacting step relating to the third modification example, while the target tooth 41a is in contact with the ring gear 106 and the target pinion 4a is pressed against the ring gear 106, the target pinion 4a is braked by the brake unit 31, so that the ring gear 106 is braked relative to the second portion 6. After this contacting step, the rotation amount calculating step is performed to release the target pinion 4a from being braked by the brake unit 31. In FIG. 8A, the brake unit 31 of the target driving device 2a is turned off at a time t8 subsequent to the time t2. At the time t8, the target pinion 4a is released from being braked by the brake unit 31.

Once the target pinion 4a is released from being braked by the brake unit 31, the target pinion 4a is no longer pressed against the ring gear 106. Since the target pinion 4a is released from being pressed against the ring gear 106, a restoring force is creased. This restoring force can act to rotate the target pinion 4a until it touches the ring gear 106 at the tooth surface facing the second side D22 in the rotation direction. Before the target pinion 4a is released from being braked by the brake unit 31, the target pinion 4a is pressed against the ring gear 106 toward the first side D21 in the rotation direction. Therefore, once the target pinion 4a is released from being braked by the brake unit 31, the target pinion 4a can rotate toward the second side D22 in the rotation direction. While the target pinion 4a is pressed, the shaft 33 of the target driving device 2a is twisted. The restoring force produced when the target pinion 4a is released from being pressed against the ring gear 106 can act to eliminate the twist when the target pinion 4a is released from being pressed.

The rotation amount calculating step relating to the third modification example is configured to detect whether the target tooth 41a touches the ring gear 106 at the tooth surface facing the second side D22 in the rotation direction. In the rotation amount calculating step relating to the third modification example, whether the target tooth 41a touches the ring gear 106 is detected in the same manner as in the rotation amount calculating step relating to the first embodiment. To be specific, in the rotation amount calculating step relating to the third modification example, whether the target tooth 41a touches the ring gear 106, or whether the target tooth 41a moves away from the ring gear 106 may be detected by detecting a change in load measured by the load sensor 73.

The rotation amount calculating step relating to the third modification example may detect whether the target tooth 41a touches the ring gear 106 by detecting a change in rotation of the target pinion 4a. To be more specific, whether the target tooth 41a touches the ring gear 106 may be detected by detecting a change in rotation of the target pinion 4a that is caused in response to the target tooth 41a touching the ring gear 106. The change in rotation of the target pinion 4a that is caused in response to the target tooth 41a touching the ring gear 106 includes reduction in speed of the rotation, suspension of the rotation, and reversal of the direction of the rotation. If such is the case, the change in rotation of the target pinion 4a may be detected using the rotation amount calculating unit 71. When the rotation amount calculating unit 71 includes the rotation sensor 34 as shown in FIG. 3, the rotation sensor 34 may be used to detect the change in rotation of the target pinion 4a.

In the example shown in FIGS. 8A and 8B, at a time t4 subsequent to the time t8, it can be detected that the target tooth 41a touches the ring gear 106 at the tooth surface facing the second side D22 in the rotation direction. In this case, the rotation amount calculating step calculates how much the target pinion 4a rotates within a period from the time t8 to the time t4.

In the contacting step relating to the third modification example, the target tooth 41a is brought into contact with the ring gear 106 so that the target pinion 4a is pressed by the ring gear 106, and the target pinion 4a is braked by the brake unit 31. In this way, the target tooth 41a remains in contact with the ring gear 106. In the rotation amount calculating step relating to the third modification example, the brake unit 31 stops braking the target pinion 4a so that the target pinion 4a is no longer pressed against the ring gear 106. This creates a restoring force that in return rotates the target pinion 4a toward the second side D22 in the rotation direction. These characteristic configurations can produce the following advantageous effects. Since the target pinion 4a is rotated toward the second side D22 in the rotation direction in the rotation amount calculating step, it is not required to separately drive only the actuator 30 of the target driving device 2a. This is the difference from the first embodiment and the first and second modification examples described above. In this way, the rotation amount calculating step can be performed without requiring a sequence that is designed to drive the actuator 30 of the target driving device 2a separately. According to the backlash measuring method having the foregoing characteristics and including the contacting step of bringing the target tooth 41a into contact with the ring gear 106 using an external force designed to rotate the second portion 6 relative to the first portion 5, the following advantageous effects are produced. In either the contacting step or the rotation amount calculating step, it is not required to separately drive the actuator 30 of the target driving device 2a. Therefore, from the start to the end, the backlash measuring method does not require the actuator 30 of the target driving device 2a to be separately driven. Thus, the backlash measuring method can be entirely performed without requiring a sequence that separately drives the actuator 30 of the target driving device 2a. In other words, the backlash measuring method can be entirely performed using the driving mechanism 1 that is only capable of collectively controlling the actuator 30 of the target driving device 2a and the actuators 30 of the driving devices 2 other than the target driving device 2a and not capable of separately driving the actuator 30 of the target driving device 2a.

Fourth Modification Example

According to the backlash measuring methods relating to the above-described first embodiment and modification examples, the target pinion 4a is rotated while the ring gear 106 is braked relative to the second portion 6 and the measured amount of rotation of the target pinion 4a is used to measure the backlash. According to the above-described first embodiment and modification examples, the backlash measuring apparatus 7 includes the rotation amount calculating unit 71 for calculating the amount of rotation of the target pinion 4a. The present invention, however, is not limited to these backlash measuring methods and backlash measuring apparatuses 7.

A backlash measuring method relating to a fourth modification example includes a contacting step, a driving mechanism rotation amount calculating step and a measuring step. In the contacting step, the target tooth 41a, which is one of the teeth 41 of the target pinion 4a, is brought into contact at the tooth surface facing a first side D11 in the circumferential direction of the ring gear 106 with the ring gear 106. In the driving mechanism rotation amount calculating step, the target pinion 4a is prevented from rotating while the contact between the target tooth 41a and the ring gear 106 achieved in the contacting step is maintained, and the driving mechanism 1 is rotated toward a second side D12 in the circumferential direction with a driving force less than the braking force applied to brake the target pinion 4a until the target tooth 41a touches the ring gear 106 at the tooth surface facing the second side D12 that is opposite to the first side D11 in the circumferential direction. In this way, the amount of rotation of the driving mechanism 1 is calculated. In the measuring step, the backlash between the ring gear 106 and the target pinion 4a is measured based on the rotation amount of the driving mechanism 1 calculated in the driving mechanism rotation amount calculating step.

The backlash measuring apparatus 7 relating to the fourth modification example includes a driving mechanism rotation amount calculating unit 74 and the measuring unit 72. The driving mechanism rotation amount calculating unit 74 calculates how much the driving mechanism 1 rotates toward the second side D12 in the circumferential direction from the state where the target tooth 41a, which is one of the teeth 41 of the target pinion 4a, is in contact with the ring gear 106 at the tooth surface facing the first side D11 in the circumferential direction of the target pinion 4a until the target tooth 41a touches the ring gear 106 at the tooth surface facing the second side D12 opposite to the first side D11 in the circumferential direction. The measuring unit 72 is configured to measure the backlash between the ring gear 106 and the target pinion 4a based on the amount of rotation of the driving mechanism 1 calculated by the driving mechanism rotation amount calculating unit 74.

Figure 9:
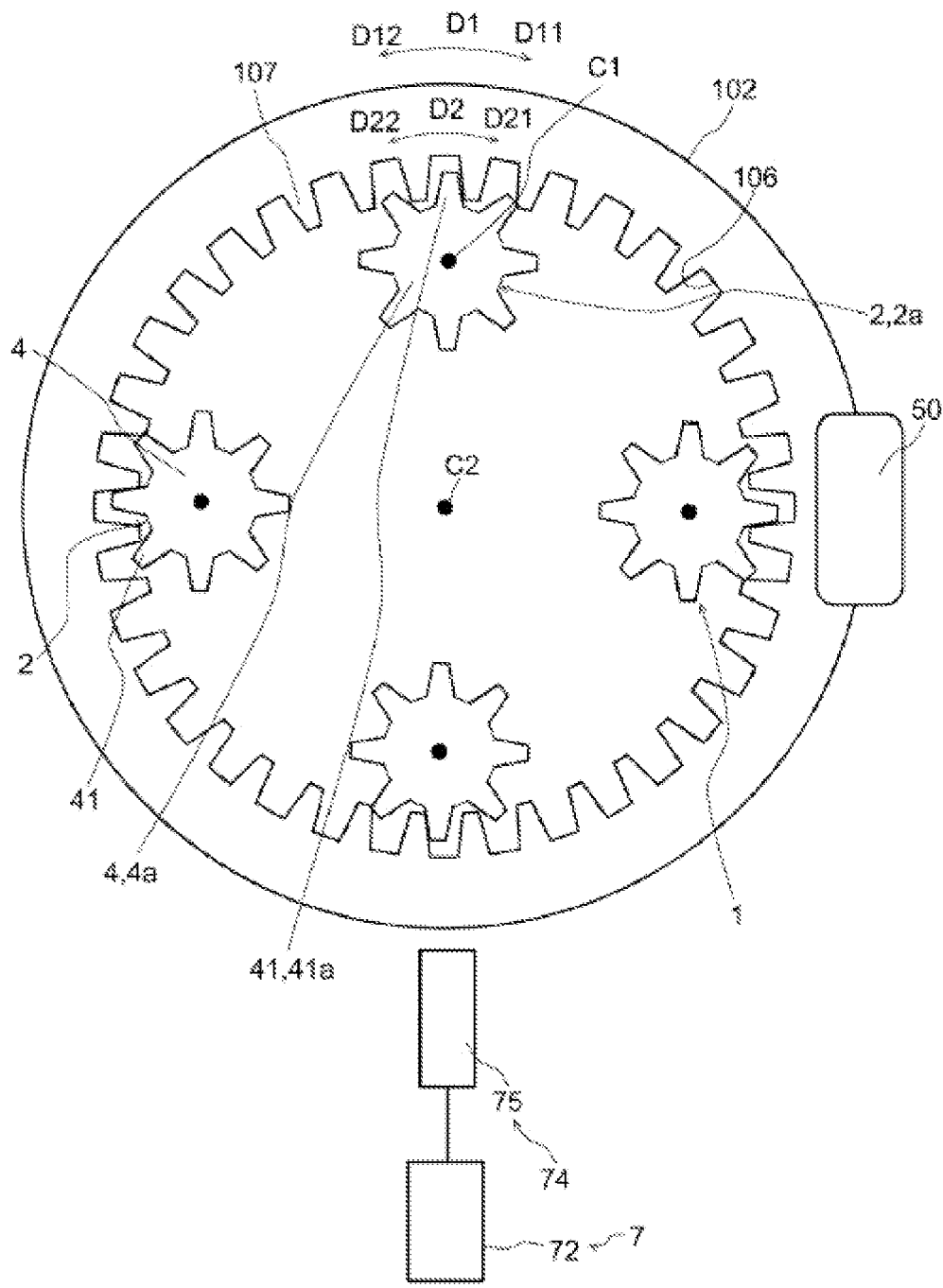
FIG. 9 is a top view showing a contacting step in a fourth modification example.

In the contacting step relating to the fourth modification example, the target tooth 41a, which is one of the teeth 41 of the target pinion 4a, is brought into contact at the tooth surface facing the first side D11 in the circumferential direction of the ring gear 106 with the ring gear 106. FIG. 9 shows that, in the contacting step relating to the fourth modification example, the target tooth 41a, which is one of the teeth 41 of the target pinion 4a, is in contact at the tooth surface facing the first side D11 in the circumferential direction of the ring gear 106 with the ring gear 106.

The contacting step relating to the fourth modification example can be performed in the same manner as the contacting step relating to the above-described first embodiment and modification examples. In the example shown in FIG. 9, the target tooth 41a is in contact with the ring gear 106 at the tooth surface facing the first side D21 in the rotation direction. In this case, the target tooth 41a is in contact with the ring gear 106 at the tooth surface facing the first side D11 in the circumferential direction.

In the fourth modification example, the contacting step is followed by the driving mechanism rotation amount calculating step. In the driving mechanism rotation amount calculating step relating to the fourth modification example, the target pinion 4a is prevented from rotating while the contact between the target tooth 41a and the ring gear 106 achieved in the contacting step is maintained. The target pinion 4a can be prevented from rotation by turning on the brake unit 31 of the target driving device 2a.

Figure 10:
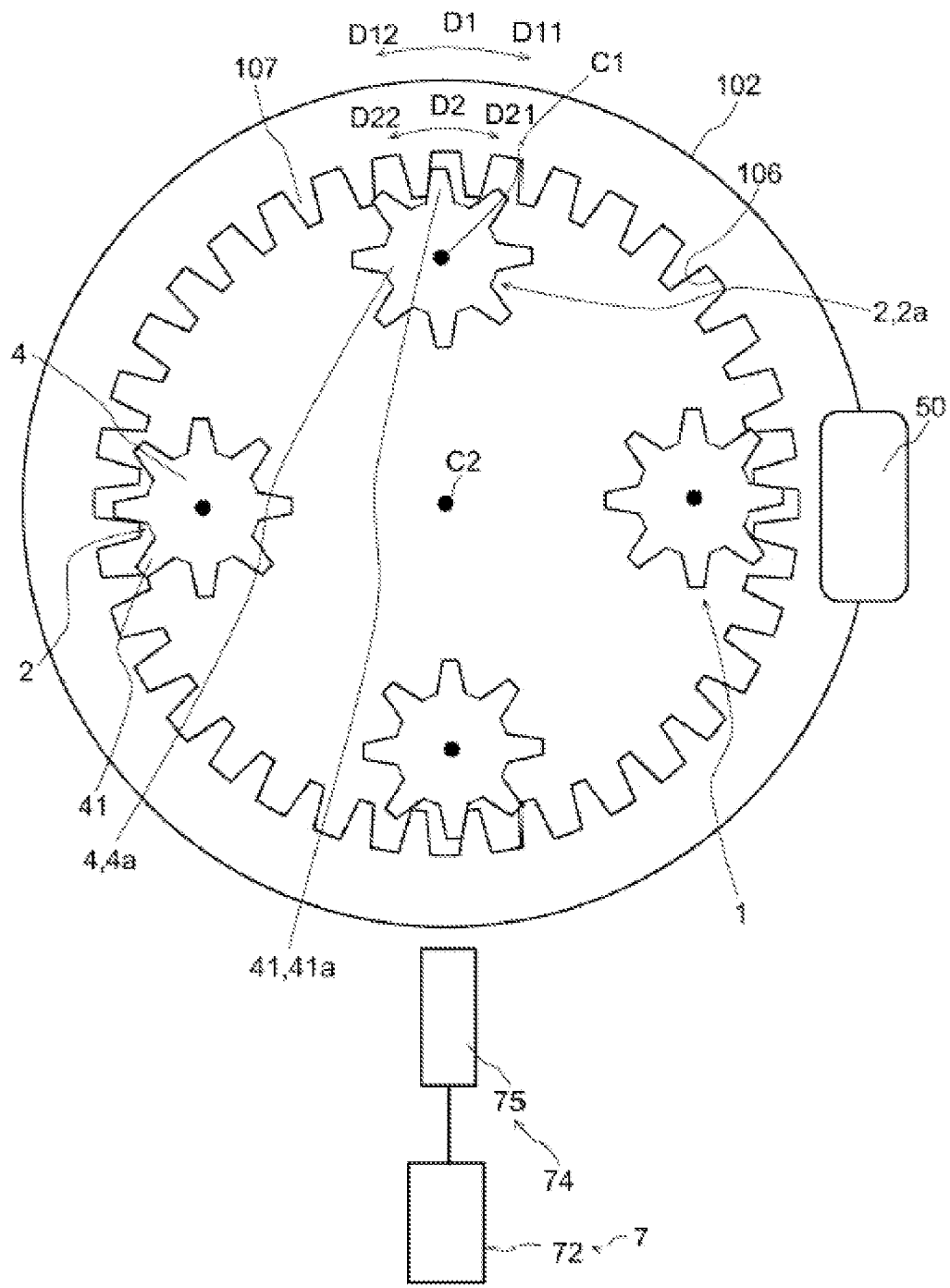
FIG. 10 is a top view showing a driving mechanism rotation amount calculating step in the fourth modification example.

In the driving mechanism rotation amount calculating step relating to the fourth modification example, after the target pinion 4a is prevented from rotating, the driving mechanism 1 is rotated toward the second side D12 in the circumferential direction relative to the ring gear 106 with a driving force less than the braking force applied to prevent the target pinion 4a from rotating while the target pinion 4a is being prevented from rotating. The driving mechanism 1 is rotated toward the second side D12 in the circumferential direction until the target tooth 41a touches the ring gear 106 at the tooth surface facing the second side D12 in the circumferential direction. FIG. 10 shows that the driving mechanism 1 shown in FIG. 9 is rotated toward the second side D12 in the circumferential direction so that the target tooth 41a has touched the ring gear 106 at the tooth surface facing the second side D12 in the circumferential direction.

The actuators 30 of the driving devices 2 other than the target driving device 2a input rotation into the respective pinions 4 so that the pinions 4 other than the target pinion 4a are rotated toward the first side D21 in the rotation direction. As a result, the driving mechanism 1 can be rotated toward the second side D12 in the circumferential direction relative to the ring gear 106. In the fourth modification example, the actuators 30 of the driving devices 2 can be individually controlled. In the driving mechanism rotation amount calculating step, the brake unit 31 of the target driving device 2a is turned on and the brake units 31 of the driving devices 2 other than the target driving device 2a are turned off, so that the actuator 30 of the target driving device 2a does not input rotation but the actuators 30 of the driving devices 2 other than the target driving device 2a input rotation into the respective pinions 4. In this way, as shown in FIGS. 9 and 10, the driving mechanism 1 can be rotated relative to the ring gear 106 while the target pinion 4a is prevented from rotating around the axis of rotation C1.

The driving mechanism rotation amount calculating step relating to the fourth modification example is configured to calculate how much the driving mechanism 1 rotates (hereinafter, referred to as the amount of rotation of the driving mechanism 1) from when the tooth surface of the target tooth 41a facing the first side D11 in the circumferential direction moves away from the ring gear 106 to when the target tooth 41a touches the ring gear 106 at the tooth surface facing the second side D12 in the circumferential direction. The driving mechanism rotation amount calculating step relating to the fourth modification example is configured to detect whether the target tooth 41a touches the ring gear 106.

Whether the target tooth 41a touches the ring gear 106 is detected in the same manner as in the rotation amount calculating step relating to the above-described first embodiment and modification examples. For example, in the driving mechanism rotation amount calculating step relating to the fourth modification example, whether the target tooth 41a touches the ring gear 106 can be detected by detecting a change in load measured by the load sensor 73. In this case, the driving mechanism rotation amount calculating step relating to the fourth modification example is configured to calculate how much the driving mechanism 1 rotates from when the driving mechanism 1 starts rotating toward the second side D12 in the circumferential direction to when it is detected that the target tooth 41a has touched the ring gear 106.

In the example shown in FIGS. 9 and 10, the wind turbine 10 includes a driving mechanism rotation sensor 75 for calculating the amount of rotation of the driving mechanism 1 relative to the ring gear 106. For example, the driving mechanism rotation sensor 75 is fixedly attached to the first portion 5 (tower 102) and configured to measure the amount of rotation of the driving mechanism 1 or the second portion 6 (nacelle 103), which is configured to rotate relative to the ring gear 106 together with the driving mechanism 1, relative to the ring gear 106. In this case, the driving mechanism rotation amount calculating step relating to the fourth modification example is configured to calculate how much the driving mechanism 1 rotates by using the driving mechanism rotation sensor 75 to directly measure the amount of rotation of the driving mechanism 1.

The driving mechanism rotation sensor 75 can be considered to be part of the driving mechanism rotation amount calculating unit 74 of the backlash measuring apparatus 7 relating to the fourth modification example. In this case, the driving mechanism rotation amount calculating unit 74 can use the driving mechanism rotation sensor 75 to calculate the amount of rotation of the driving mechanism 1.

The driving mechanism rotation amount calculating step is followed by the measuring step of measuring the backlash between the ring gear 106 and the target pinion 4a. In the measuring step relating to the fourth modification example, the backlash can be measured by calculating the backlash based on the amount of rotation of the driving mechanism 1, which is calculated in the driving mechanism rotation amount calculating step. In the measuring step relating to the fourth modification example, the amount of rotation of the target pinion 4a, which is calculated in the driving mechanism rotation amount calculating step, is used to measure normal backlash or the width w1 indicated in FIG. 4. The measuring step of measuring the backlash can be performed by the measuring unit 72 of the measuring apparatus 7. The measuring unit 72 relating to the fourth modification example is configured in the same manner as the measuring unit 72 of the measuring apparatus 7 relating to the above-described first embodiment.

The backlash measuring method relating to the fourth modification example includes the contacting step, driving mechanism rotation amount calculating step and measuring step as described above. The backlash measuring apparatus 7 relating to the fourth modification example includes the driving mechanism rotation amount calculating unit 74 and measuring unit 72 as described above. The backlash measuring method and backlash measuring apparatus 7 described above can be also used to measure the backlash between the ring gear 106 and the pinions 4 in the wind turbine 10 including the ring gear 106 and the driving devices 2 having the pinions 4 meshing with the ring gear 106. It should be particularly noted that the backlash measuring method relating to the fourth modification example can be used to measure the backlash between the ring gear 106 and the pinions 4 without having to stop the operation of the wind turbine 10 and disassemble the wind turbine 10. Therefore, the backlash measuring method relating to the fourth modification example can be used to readily collect the data of the backlash including its values measured at a plurality of different times.

Second Embodiment

The following now describes a wind turbine diagnosing method relating to a second embodiment of the present invention for diagnosing the wind turbine 10. The second embodiment of the present invention provides a wind turbine diagnosing method of diagnosing the wind turbine 10 including the ring gear 106 and the driving mechanism 1. The ring gear 106 is fixedly attached to the first portion 5 of the wind turbine 10, and the driving mechanism 1 is fixedly attached to the second portion 6 of the wind turbine 10. The driving mechanism 1 includes one or more driving devices 2 having respective pinions 4 meshing with the ring gear 106. The driving mechanism 1 is configured to rotate in the circumferential direction D1 of the ring gear 106 to drive the second portion 6 relative to the first portion 5. The wind turbine diagnosing method relating to the second embodiment to be applied to the wind turbine 10 includes a first measuring step, a second measuring step and a diagnosing step. The first measuring step is configured to measure at a first time the backlash between the ring gear 106 and a first target pinion 4a, which is one of the pinions 4 of the driving devices 2. The second measuring step is configured to measure at a second time subsequent to the first time, the backlash between the ring gear 106 and a second target pinion 4a, which is one of the pinions 4 of the driving devices 2. The diagnosing step is configured to diagnose the condition of the wind turbine 10 based on the backlash measured at the first time and the backlash measured at the second time.

In the first and second measuring steps, the backlash between the ring gear 106 and the target pinion 4a is measured according to the backlash measuring method described above in relation to the first embodiment and modification examples. To be more specific, the wind turbine diagnosing method relating to the second embodiment to be applied to the wind turbine 10 includes: the first measuring step of performing the backlash measuring method described above in relation to the first embodiment and modification examples at the first time to measure the backlash at the first time; the second measuring step of performing the backlash measuring method at the second time subsequent to the first time to measure the backlash at the second time; and the diagnosing step of diagnosing the condition of the wind turbine 10 based on the backlash measured at the first time and the backlash measured at the second time.

When the driving mechanism 1 includes more than one driving device 2 as shown in FIG. 4, the first target pinion 4a for which the backlash is measured in the first measuring step may be the same as or different from the second target pinion 4a for which the backlash is measured in the second measuring step. When the first target pinion 4a is the same as the second target pinion 4a, the target tooth 41a of the first measuring step may be the same as or different from the target tooth 41a of the second measuring step. Whether the first target pinion 4a is the same as the second target pinion 4a, and whether the target tooth 41a of the first measuring step is the same as the target tooth 41a of the second measuring step may be determined as appropriate for the purposes of the diagnosis made in the diagnosing step, which will be described below.

In the diagnosing step, the condition of the wind turbine 10 is diagnosed based on the backlash at the first time and the backlash at the second time. For example, in the diagnosing step, the difference obtained by subtracting the backlash at the second time from the backlash at the first time is calculated as the total abraded width by which the ring gear 106 and target pinion 4a are abraded within the period from the first time to the second time. Based on the calculated total abraded with, the condition of the wind turbine 10 is diagnosed.

For example, an allowable upper limit is set for the total abraded width in the diagnosing step. The condition of the wind turbine 10 may be diagnosed by determining whether the calculated total abraded width exceeds the upper limit. In this case, if the calculated total abraded width exceeds the upper limit, the ring gear 106 or pinions 4 may be diagnosed to need replaced or repaired. If the calculated total abraded width is equal to or less than the upper limit, the ring gear 106 or pinions 4 may be diagnosed not to need replaced or repaired. The upper limit for the total abraded width may be set such that the rattling of the driving mechanism 1 and second portion 6 can fall within an allowable range. The upper limit for the total abraded width may be set such that the likelihood of fatigue breakdown of the ring gear 106 and pinions 4 can fall within an allowable range. The upper limit for the total abraded width may be set such that, when the surface of the ring gear 106 and pinions 4 is formed by a hardened layer, the hardened layer can be determined not to be completely abraded.

The wind turbine diagnosing method relating to the second embodiment to be applied to the wind turbine 10 includes the first measuring step, the second measuring step and the diagnosing step. the wind turbine 10 The wind turbine diagnosing method can be used to diagnose the condition of the ring gear 106 and pinions 4 of the wind turbine 10 by comparing the values of the backlash measured at different times. More specifically, the backlash measured at the first time can be used as the initial value in order to examine an increase in backlash from the initial value from the perspective of the risk of fatigue breakdown of the ring gear 106 or pinions 4 and in relation to the thickness of the hardened layer on the surface of the ring gear 106 or pinions 4. In this way, the integrity of the ring gear 106 and pinions 4 can be evaluated.

According to the wind turbine diagnosing method relating to the second embodiment, in the diagnosing step, the difference obtained by subtracting the backlash at the second time from the backlash at the first time is calculated as the total abraded width by which the ring gear 106 and target pinion 4a are abraded within the period from the first time to the second time, and the condition of the wind turbine 10 is diagnosed based on the total abraded width. According to the wind turbine diagnosing method relating to the second embodiment, the condition of the wind turbine 10 can be diagnosed based on the total abraded width by which the ring gear 106 and the target pinion 4a are abraded within the time period from the first time to the second time.

Fifth Modification Example

According to the second embodiment described above, the wind turbine diagnosing method to be applied to the wind turbine 10 includes the first measuring step of measuring the backlash at the first time and the second measuring step of measuring the backlash at the second time. In the wind turbine diagnosing method to be applied to the wind turbine 10, however, the backlash can be measured at any other times.

A backlash measuring method relating to a fifth modification example includes a collecting step and a diagnosing step. In the collecting step, the backlash between the ring gear 106 and the target pinion 4a, which is the pinion 4 of the driving device 2, is measured at a plurality of different times to collect chronological data for the backlash. In the diagnosing step, the condition of the wind turbine 10 is diagnosed based on the chronological data for the backlash collected in the collecting step.

In the collecting step relating to the fifth modification example, the backlash is measured at a plurality of different times according to the backlash measuring methods relating to the above-described first embodiment and modification examples. In other words, in the collecting step, the above-described backlash measuring methods relating to the first embodiment and modification examples are performed at a plurality of different times to collect chronological data for the backlash. The description about the backlash measuring method in the first and second measuring steps relating to the second embodiment is applicable to the backlash measuring method used to measure the backlash at a plurality of different times in the collecting step relating to the fifth modification example, unless they contradict each other.

Figure 11:
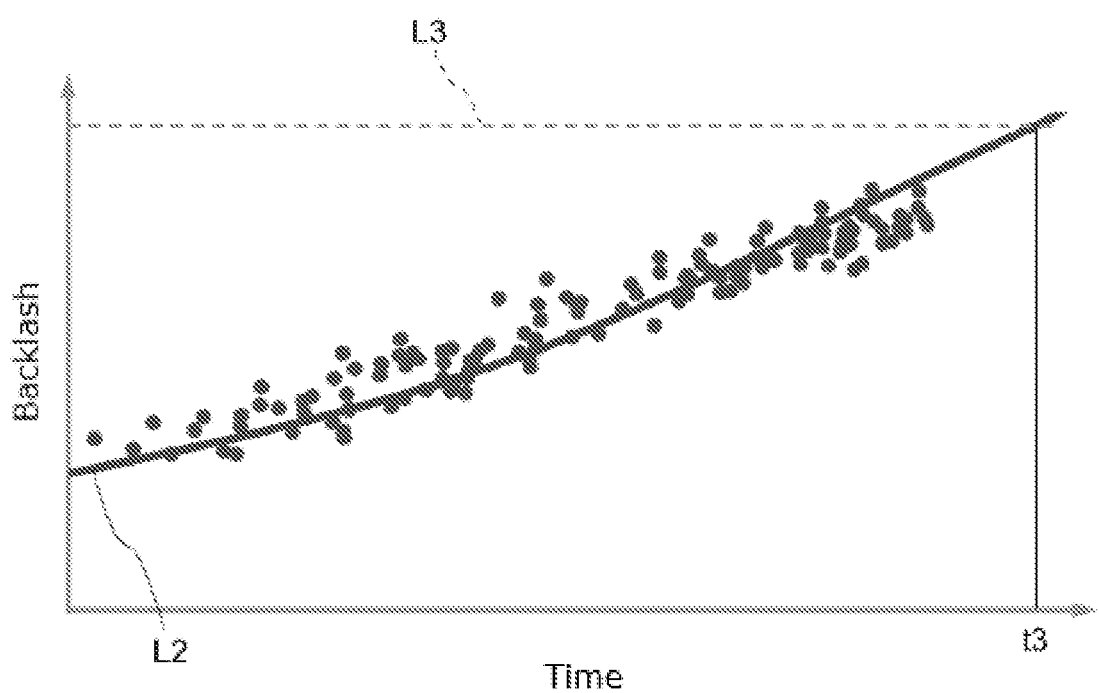
FIG. 11 shows an example of a graph presenting chronological data for backlash collected in a collecting step in a fifth modification example.

In the diagnosing step relating to the fifth modification example, the condition of the wind turbine 10 is diagnosed based on the chronological data for the backlash collected in the collecting step. FIG. 11 shows an example of a graph presenting the chronological data for the backlash collected in the collecting step. In the diagnosing step, for example, the chronological data for the backlash collected in the collecting step is displayed in a graph, as shown in FIG. 11. In the graph shown in FIG. 11, the vertical axis represents the value of the backlash measured in the collecting step. In the graph shown in FIG. 11, the horizontal axis represents how much the time elapses after a reference time and the time at which the backlash is measured in the collecting step.

For example, in the diagnosing step relating to the fifth modification example, an allowable upper limit is set for the backlash. The dashed line indicated by the sign "L3" in FIG. 11 shows the allowable upper limit for the backlash, for example. The upper limit for the backlash may be set such that the rattling of the driving mechanism 1 and second portion 6 can fall within an allowable range. Alternatively, the upper limit for the backlash may be set such that the likelihood of fatigue breakdown of the ring gear 106 and pinions 4 can fall within an allowable range. Alternatively, the upper limit for the backlash may be set such that, when the surface of the ring gear 106 and pinions 4 is formed by a hardened layer, the abraded width of the ring gear 106 and pinions 4 can fall within such a range that the hardened layer can be determined not to be completely abraded.

In a case where the allowable upper limit is set for the backlash, the diagnosing step relating to the fifth modification example may determine whether the backlash exceeds the upper limit at a certain time at which the backlash is measured in the collecting step. In this way, the condition of the wind turbine 10 may be diagnosed at the time at which the backlash is measured. In this case, if the backlash exceeds the upper limit, the ring gear 106 or pinions 4 may be diagnosed to need replaced or repaired. If the backlash is equal to or less than the upper limit, the ring gear 106 or pinions 4 may be diagnosed not to need replaced or repaired.

In a case where the allowable upper limit is set for the backlash, the diagnosing step relating to the fifth modification example may consult the chronological data for the backlash collected in the collecting step to determine the time at which the backlash is expected to exceed the upper limit. To determine the time at which the backlash is expected to exceed the upper limit, an approximate expression representing the relation between the elapsed time from the reference time and the value of the backlash may be calculated based on the chronological data for the backlash. The solid line indicated by the sign "L2" in FIG. 11 shows, as an example, the approximate expression representing the relation between the elapsed time from the reference time and the value of the backlash. In the example shown in FIG. 11, the dashed line L3 representing the allowable upper limit for the backlash crosses, at a time t3, the solid line L2 representing the approximate expression representing the relation between the elapsed time from the reference time and the value of the backlash. In this case, the backlash measured at the time t3 can be expected to become equal to the allowable upper limit for the backlash, and the backlash measured at a time subsequent to the time t3 can be expected to exceed the upper limit.

The wind turbine diagnosing method relating to the fifth modification example to be applied to the wind turbine 10 includes the collecting step and the diagnosing step. The wind turbine diagnosing method can be used to diagnose the condition of the ring gear 106 and pinions 4 of the wind turbine 10 by comparing the values of the backlash measured at different times. More specifically, an increase in backlash from the value measured at the time at which the collecting step is started can be examined from the perspective of the risk of fatigue breakdown of the ring gear 106 or pinions 4 and in relation to the thickness of the hardened layer on the surface of the ring gear 106 or pinions 4. In this way, the integrity of the ring gear 106 and pinions 4 can be evaluated. Since the time at which the backlash is to exceed the allowable upper limit is expected, future symptoms can be predicted and used to plan the maintenance.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

Aspects of the invention are not limited to the foregoing embodiments and embrace various modifications conceivable by those skilled in the art. Advantageous effects of the invention are also not limited to those described above. That is, various additions, changes, and partial deletions are possible in a range of not departing from the conceptual ideas and spirit of the present invention derived from contents defined in the claims and the equivalents thereof.

What is claimed is:

1. A backlash measuring method using a controller having one or more processors for a wind turbine including a ring gear and a driving mechanism, the ring gear being fixedly attached to a first portion of the wind turbine, the driving mechanism being fixedly attached to a second portion of the wind turbine, the driving mechanism including a plurality of driving devices, each driving device having a pinion meshing with the ring gear, the driving mechanism being configured to rotate in a circumferential direction of the ring gear to drive the second portion relative to the first portion, the controller of the wind turbine being configured to measure backlash between a target pinion and the ring gear, the target pinion being the one of the pinions of the plurality of driving devices, the backlash measuring method comprising:
a contacting step of bringing a target tooth of the target pinion into contact, at a tooth surface facing a first side in a rotation direction of the target pinion, with the ring gear, the target tooth being one of teeth of the target pinion;
a rotation amount calculating step of (i) braking the ring gear relative to the second portion while the contact between the target tooth and the ring gear achieved in the contacting step is maintained, (ii) causing the target pinion to rotate toward a second side in the rotation direction opposite to the first side with a driving force less than a braking force applied to brake the ring gear relative to the second portion until the target tooth touches the ring gear at a tooth surface facing the second side in the rotation direction, and (iii) calculating an amount of rotation of the target pinion; and
a measuring step of measuring, using the controller, the backlash between the ring gear and the target pinion based on the amount of rotation of the target pinion calculated in the rotation amount calculating step,
wherein each driving device includes a brake unit configured to prevent rotation of the pinion,
wherein, in the contacting step, while the target pinion is braked by the brake unit and a pinion other than the target pinion is free from braking by a brake unit, the controller of the wind turbine is configured to bring the target tooth into contact with the ring gear using an external force designed to rotate the second portion relative to the first portion.

2. The backlash measuring method of claim 1, wherein the driving device includes:
an actuator configured to input rotation into the pinion; and
a speed reducer configured to reduce the input rotation transmitted from the actuator and transmit the reduced rotation to the pinion, and
wherein, in the rotation amount calculating step, the amount of rotation of the target pinion is calculated based on a measured amount of the input rotation transmitted from the actuator to the speed reducer.

3. The backlash measuring method of claim 1, wherein in at least one of the contacting step or the rotation amount calculating step, whether the target tooth touches the ring gear is detected by detecting a change in load measured by a load sensor configured to measure load applied by the ring gear to the target pinion.

4. The backlash measuring method of claim 3, wherein the driving device includes an actuator for inputting rotation into the pinion, and
wherein the contacting step includes:
a detecting step of detecting whether the target tooth touches the ring gear by detecting a rise in load measured by the load sensor;
an inputting step of, when the load sensor detects that the target tooth touches the ring gear in the detecting step, allowing the actuator to input rotation into the target pinion, the rotation being directed toward one of sides in the rotation direction of the target pinion; and
an identifying step of, when the rotation input in the inputting step causes a rise in the load measured by the load sensor, identifying a side toward which the rotation input in the inputting step is directed as the first side in the rotation direction faced by the tooth surface of the target tooth that is in contact with the ring gear.

5. The backlash measuring method of claim 1, wherein the driving device includes:
an actuator for inputting rotation into the pinion; and
a brake unit for preventing rotation of the pinion, and
wherein, in the contacting step, the target tooth is brought into contact with the ring gear by causing the actuator to rotate the target pinion while the ring gear is braked relative to the second portion.

6. The backlash measuring method of claim 1, wherein the driving device includes an actuator configured to input rotation into the pinion, and
wherein, in the rotation amount calculating step, the actuator is used to rotate the target pinion toward the second side in the rotation direction.

7. The backlash measuring method of claim 1, wherein the driving device includes a brake unit for preventing rotation of the pinion,
wherein, in the contacting step, the target tooth is brought into contact with the ring gear so that the target pinion is pressed by the ring gear, and the target pinion is braked by the brake unit so that the target tooth remains in contact with the ring gear, and
wherein, in the rotation amount calculating step, the brake unit stops braking the target pinion so that the target pinion is released from being pressed against the ring gear and a restoring force is in turn created, and the restoring force acts to rotate the target pinion toward the second side in the rotation direction.

8. The backlash measuring method of claim 1, wherein the wind turbine further includes a rotation brake configured to prevent rotation of the second portion relative to the ring gear, and
wherein, in the rotation amount calculating step, the rotation brake prevents rotation of the second portion relative to the ring gear, so that the ring gear is braked relative to the second portion.

9. The backlash measuring method of claim 1,
wherein, in the rotation amount calculating step, the ring gear is braked relative to the second portion by allowing at least one of pinions other than the target pinion to be braked by a brake unit.

10. A wind turbine diagnosing method for a wind turbine, comprising:
a first measuring step of performing the backlash measuring method of claim 1 at a first time to measure backlash at the first time;
a second measuring step of performing the backlash measuring method at a second time subsequent to the first time to measure the backlash at the second time; and
a diagnosing step of diagnosing a condition of the wind turbine based on the backlash measured at the first time and the backlash measured at the second time.

11. The wind turbine diagnosing method of claim 10, wherein, in the diagnosing step, a difference is calculated by subtracting the backlash measured at the second time from the backlash measured at the first time as a total abraded width by which the ring gear and the target pinion are abraded within a period from the first time to the second time, and the condition of the wind turbine is diagnosed based on the total abraded width.

12. A wind turbine diagnosing method comprising:
a collecting step of performing the backlash measuring method of claim 1 at a plurality of different times to collect chronological data for the backlash; and
a diagnosing step of diagnosing a condition of the wind turbine based on the chronological data for the backlash collected in the collecting step.

13. The backlash measuring method of claim 1, wherein the backlash measuring method further comprises:
performing a maintenance operation on the target pinion based on the determining so that the backlash between the ring gear and the target pinion does not exceed an allowable upper limit.

\* \* \* \* \*